(12) United States Patent
Kaye

(10) Patent No.: US 10,901,403 B2
(45) Date of Patent: Jan. 26, 2021

(54) DEVELOPING LINEAR PROCESS MODELS USING REACTOR KINETIC EQUATIONS

(71) Applicant: UOP LLC, Des Plaines, IL (US)

(72) Inventor: Joel Joshua Kaye, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 313 days.

(21) Appl. No.: 15/899,967

(22) Filed: Feb. 20, 2018

(65) Prior Publication Data

US 2019/0258234 A1    Aug. 22, 2019

(51) Int. Cl.
| G05B 19/418 | (2006.01) |
| G05B 23/02 | (2006.01) |
| G05B 13/00 | (2006.01) |
| G05B 23/00 | (2006.01) |

(52) U.S. Cl.
CPC ....... *G05B 19/41885* (2013.01); *G05B 23/00* (2013.01); *G05B 23/024* (2013.01); *G05B 2219/42155* (2013.01)

(58) Field of Classification Search
CPC ............ G06Q 10/06395; G05B 19/401; G05B 19/4063; G05B 19/4148; G05B 19/41885; G05B 2219/31457; G05B 2219/42155; G05B 23/02; G05B 23/024; G05B 23/0289
USPC .................................... 700/266; 702/22, 127
See application file for complete search history.

(56) References Cited

U.S. PATENT DOCUMENTS

| 4,159,239 A | 6/1979 | Schwartz .................... 208/113 |
| 4,267,458 A | 5/1981 | Uram ........................ 290/40 R |
| 4,284,494 A | 8/1981 | Bartholic ................... 208/164 |
| 4,362,614 A | 12/1982 | Asdigian |
| 4,380,146 A | 4/1983 | Yannone ................... 60/39.281 |
| 4,385,985 A | 5/1983 | Gross ......................... 208/113 |

(Continued)

FOREIGN PATENT DOCUMENTS

| EP | 0181744 A1 | 5/1986 |
| EP | 2746884 A1 | 6/2014 |

(Continued)

OTHER PUBLICATIONS

Hogue, Biodiesel, Modelling of the production of biodiesel by reactive distillation (Year: 2012).*

(Continued)

*Primary Examiner* — Dean Kwak

(57) ABSTRACT

Methods, systems, and apparatuses for developing linear process models to improve performance of components that make up operations in a plant are described herein. In some arrangements, a system may leverage one or more sensors and/or measurement devices to identify rates and compositions of feed and yield. The system may use one or more stoichiometric matrices and/or differential equations to identify molar and mass solutions for each feed component and predict the yield for reaction rates on a component-by-component basis. The system may further adjust the reaction rate coefficients to minimize the deviation between the yield results and the yield identified by system sensors and/or measuring devices. The resulting linear process models may be utilized to optimize plant processes in order to minimize reaction waste and maximize reaction yield.

11 Claims, 10 Drawing Sheets

(56) References Cited

U.S. PATENT DOCUMENTS

| | | | |
|---|---|---|---|
| 4,411,773 A | 10/1983 | Gross | 208/159 |
| 4,709,546 A | 12/1987 | Weiler | 415/116 |
| 4,775,460 A | 10/1988 | Reno | |
| 4,795,545 A | 1/1989 | Schmidt | |
| 4,902,469 A | 2/1990 | Watson | 376/216 |
| 5,077,252 A | 12/1991 | Owen et al. | 502/43 |
| 5,227,121 A | 7/1993 | Scarola | 340/525 |
| 5,582,684 A | 12/1996 | Holmqvist et al. | |
| 5,605,435 A | 2/1997 | Haugen | 137/514 |
| 5,616,214 A | 4/1997 | Leclerc | |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,013,172 A * | 1/2000 | Chang | B01J 19/0006 208/113 |
| 6,038,540 A | 3/2000 | Krist et al. | 705/8 |
| 6,081,230 A | 6/2000 | Hoshino | 342/357.32 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,727,096 B1 * | 4/2004 | Wang | B01F 15/00207 374/E13.001 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,836,941 B2 | 11/2010 | Song et al. | |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,630,962 B2 | 1/2014 | Maeda | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,571,919 B2 | 2/2017 | Zhang et al. | |
| 9,580,341 B1 | 2/2017 | Brown et al. | |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | |
| 2004/0148144 A1 | 7/2004 | Martin | |
| 2004/0204775 A1 | 10/2004 | Keyes | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0029163 A1 | 2/2005 | Letzsch | 208/113 |
| 2005/0098033 A1 | 5/2005 | Mallavarapu et al. | 95/96 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim | 73/40.5 R |
| 2013/0079899 A1 | 3/2013 | Baramov | 700/32 |
| 2013/0090088 A1 | 4/2013 | Chevsky et al. | |
| 2013/0094422 A1 | 4/2013 | Thanikachalam | 370/312 |
| 2013/0172643 A1 | 7/2013 | Pradeep | 585/310 |

(56) References Cited

U.S. PATENT DOCUMENTS

| | | |
|---|---|---|
| 2013/0253898 A1 | 9/2013 | Meagher et al. ............... 703/18 |
| 2013/0270157 A1 | 10/2013 | Ferrara ................... 208/48 AA |
| 2013/0311437 A1 | 11/2013 | Stluka et al. ................. 707/706 |
| 2013/0327052 A1 | 12/2013 | O'Neill ............ 60/772 |
| 2014/0008035 A1 | 1/2014 | Patankar et al. |
| 2014/0026598 A1 | 1/2014 | Trawicki ........................... 62/56 |
| 2014/0074273 A1 | 3/2014 | Mohideen et al. ............. 700/98 |
| 2014/0114039 A1 | 4/2014 | Benham et al. ........... 526/348.5 |
| 2014/0131027 A1 | 5/2014 | Chir ............... 165/300 |
| 2014/0163275 A1 | 6/2014 | Yanagawa et al. ........... 585/319 |
| 2014/0179968 A1 | 6/2014 | Yanagawa et al. ........... 585/476 |
| 2014/0212978 A1 | 7/2014 | Sharpe, Jr. et al. ............... 436/6 |
| 2014/0294683 A1 | 10/2014 | Siedler ......................... 422/129 |
| 2014/0294684 A1 | 10/2014 | Siedler .......................... 422/129 |
| 2014/0296058 A1 | 10/2014 | Sechrist et al. ................. 502/53 |
| 2014/0309756 A1 | 10/2014 | Trygstad ......................... 700/31 |
| 2014/0337256 A1 | 11/2014 | Varadi et al. .................... 706/12 |
| 2014/0337277 A1 | 11/2014 | Asenjo et al. |
| 2015/0059714 A1 | 3/2015 | Bernards .................. 123/568.11 |
| 2015/0060331 A1 | 3/2015 | Sechrist et al. |
| 2015/0077263 A1 | 3/2015 | Ali et al. ........................ 340/679 |
| 2015/0078970 A1 | 3/2015 | Iddir et al. .................... 422/218 |
| 2015/0098862 A1 | 4/2015 | Lok et al. ......................... 422/49 |
| 2015/0158789 A1 | 6/2015 | Keusenkothen ................ 60/780 |
| 2015/0185716 A1 | 7/2015 | Wichmann et al. ........... 700/287 |
| 2015/0276208 A1 | 10/2015 | Maturana et al. ............. 700/274 |
| 2015/0284641 A1 | 10/2015 | Shi ................ 208/113 |
| 2015/0330571 A1 | 11/2015 | Beuneken ......................... 141/4 |
| 2016/0033941 A1 | 2/2016 | T et al. ........................... 700/81 |
| 2016/0048119 A1 | 2/2016 | Wojsznis ......................... 700/11 |
| 2016/0098037 A1 | 4/2016 | Zornio et al. .................. 700/20 |
| 2016/0098234 A1 | 4/2016 | Weaver ........................ 358/1.15 |
| 2016/0122663 A1 | 5/2016 | Pintar et al. |
| 2016/0147204 A1 | 5/2016 | Wichmann et al. .......... 700/287 |
| 2016/0237910 A1 | 8/2016 | Saito |
| 2016/0260041 A1 | 9/2016 | Horn et al. |
| 2016/0291584 A1 | 10/2016 | Horn et al. |
| 2016/0292188 A1 | 10/2016 | Horn et al. |
| 2016/0292325 A1 | 10/2016 | Horn et al. |
| 2016/0313653 A1 | 10/2016 | Mink |
| 2016/0363315 A1 | 12/2016 | Colannino et al. |
| 2017/0009932 A1 | 1/2017 | Oh |
| 2017/0058213 A1 | 3/2017 | Oprins ........................... 585/303 |
| 2017/0082320 A1 | 3/2017 | Wang |
| 2017/0107188 A1 | 4/2017 | Kawaguchi |
| 2017/0284410 A1 | 10/2017 | Sharpe, Jr. |
| 2017/0315543 A1 | 11/2017 | Horn et al. |
| 2017/0323038 A1 | 11/2017 | Horn et al. |
| 2017/0352899 A1 | 12/2017 | Asai |
| 2018/0046155 A1 | 2/2018 | Horn et al. |
| 2018/0081344 A1 | 3/2018 | Romatier et al. |
| 2018/0082569 A1 | 3/2018 | Horn et al. |
| 2018/0121581 A1 | 5/2018 | Horn et al. |
| 2018/0122021 A1 | 5/2018 | Horn et al. |
| 2018/0155638 A1 | 6/2018 | Al-Ghamdi ..................... 208/79 |
| 2018/0155642 A1 | 6/2018 | Al-Ghamdi et al. |
| 2018/0197350 A1 | 7/2018 | Kim |
| 2018/0275690 A1 | 9/2018 | Lattanzio et al. |
| 2018/0275691 A1 | 9/2018 | Lattanzio et al. |
| 2018/0275692 A1 | 9/2018 | Lattanzio et al. |
| 2018/0280914 A1 | 10/2018 | Victor et al. |
| 2018/0280917 A1 | 10/2018 | Victor et al. |
| 2018/0282633 A1 | 10/2018 | Van de Cotte et al. |
| 2018/0282634 A1 | 10/2018 | Van de Cotte et al. |
| 2018/0282635 A1 | 10/2018 | Van de Cotte et al. |
| 2018/0283368 A1 | 10/2018 | Van de Cotte et al. |
| 2018/0283392 A1 | 10/2018 | Van de Cotte et al. |
| 2018/0283404 A1 | 10/2018 | Van de Cotte et al. |
| 2018/0283811 A1 | 10/2018 | Victor et al. |
| 2018/0283812 A1 | 10/2018 | Victor et al. |
| 2018/0283813 A1 | 10/2018 | Victor et al. |
| 2018/0283815 A1 | 10/2018 | Victor et al. |
| 2018/0283816 A1 | 10/2018 | Victor et al. |
| 2018/0283818 A1 | 10/2018 | Victor et al. |
| 2018/0284705 A1 | 10/2018 | Van de Cotte et al. |
| 2018/0286141 A1 | 10/2018 | Van de Cotte et al. |
| 2018/0311609 A1 | 11/2018 | McCool et al. |
| 2018/0362862 A1 | 12/2018 | Gellaboina et al. |
| 2018/0363914 A1 | 12/2018 | Faiella et al. |
| 2018/0364747 A1 | 12/2018 | Charr et al. |
| 2019/0002318 A1 | 1/2019 | Thakkar et al. |
| 2019/0003978 A1 | 1/2019 | Shi et al. |
| 2019/0015806 A1 | 1/2019 | Gellaboina et al. |
| 2019/0041813 A1 | 2/2019 | Horn et al. |
| 2019/0083920 A1 | 3/2019 | Bjorklund et al. |
| 2019/0101336 A1 | 4/2019 | Victor et al. |
| 2019/0101342 A1 | 4/2019 | Victor et al. |
| 2019/0101907 A1 | 4/2019 | Charr et al. |
| 2019/0102966 A1 | 4/2019 | Lorenz |
| 2019/0108454 A1 | 4/2019 | Banerjee et al. |
| 2019/0120810 A1 | 4/2019 | Kumar et al. |
| 2019/0151814 A1 | 5/2019 | Victor et al. |
| 2019/0155259 A1 | 5/2019 | Romatier et al. |

FOREIGN PATENT DOCUMENTS

| | | |
|---|---|---|
| EP | 2801937 A1 | 11/2014 |
| GB | 1134439 A | 11/1968 |
| WO | WO 1990/010083 A1 | 9/1990 |
| WO | WO 2001/060951 A1 | 8/2001 |
| WO | WO 2006/044408 A1 | 4/2006 |
| WO | WO 2007/095585 A2 | 8/2007 |
| WO | WO 2009/046095 A1 | 4/2009 |
| WO | WO 2014/042508 A1 | 3/2014 |
| WO | WO 2014/123993 A1 | 8/2014 |
| WO | WO 2016/141128 A1 | 9/2016 |
| WO | WO 2017/079058 A1 | 5/2017 |

OTHER PUBLICATIONS

WO App. PCT/US2019/018731: International Search Report and Written Opinion (dated Feb. 20, 2019).

U.S. Appl. No. 15/058,658, filed Mar. 3, 2015, Ian G. Horn Zak Alzein Paul Kowalczyk Christophe Romatier, System And Method For Managing Web-Based Refinery Performance Optimization Using Secure Cloud Computing.

U.S. Appl. No. 15/640,120, filed Mar. 30, 2015, Ian G. Horn Zak Alzein Paul Kowalczyk Christophe Romatier, Evaluating Petrochemical Plant Errors To Determine Equipment Changes For Optimized Operations.

U.S. Appl. No. 15/851,207, filed Mar. 27, 2017, Louis A. Lattanzio Alex Green Ian G. Horn Matthew R. Wojtowicz, Operating Slide Valves In Petrochemical Plants Or Refineries.

U.S. Appl. No. 15/851,343, filed Dec. 21, 2017, Louis A. Lattanzio Alex Green Ian G. Horn Matthew R. Wojtowicz, Early Prediction And Detection Of Slide Valve Sticking In Petrochemical Plants Or Refineries.

U.S. Appl. No. 15/851,360, filed Mar. 27, 2017, Louis A. Lattanzio Alex Green Ian G. Horn Matthew R. Wojtowicz, Measuring And Determining Hot Spots In Slide Valves For Petrochemical Plants Or Refineries.

U.S. Appl. No. 15/853,689, filed Mar. 30, 2015, Ian G. Horn Zak Alzein Paul Kowalczyk Christophe Romatier, Cleansing System For A Feed Composition Based On Environmental Factors.

U.S. Appl. No. 15/858,767, filed Dec. 28, 2017, Ian G. Horn Zak Alzein Paul Kowalczyk Christophe Romatier, Chemical Refinery Performance Optimization.

U.S. Appl. No. 15/899,967, filed Feb. 20, 2018, Joel Kaye, Developing Linear Process Models Using Reactor Kinetic Equations.

U.S. Appl. No. 15/935,827, filed Mar. 28, 2017, Michael R. Van de Cotte Ian G. Horn, Rotating Equipment In A Petrochemical Plant Or Refinery.

U.S. Appl. No. 15/935,847, filed Mar. 28, 2017, Michael R. Van de Cotte Ian G. Horn, Rotating Equipment In A Petrochemical Plant Or Refinery.

U.S. Appl. No. 15/935,872, filed Mar. 28, 2017, Michael R. Van de Cotte Ian G. Horn, 3744early Surge Detection Of Rotating Equipment In A Petrochemical Plant Or Refinery.

(56) References Cited

OTHER PUBLICATIONS

U.S. Appl. No. 15/935,898, filed Mar. 28, 2017, Michael R. Van de Cotte Ian G. Horn, Reactor Loop Fouling Monitor For Rotating Equipment In A Petrochemical Plant Or Refinery.
U.S. Appl. No. 15/935,920, filed Mar. 28, 2017, Michael R. Van de Cotte Ian G. Horn, Sensor Location For Rotating Equipment In A Petrochemical Plant Or Refinery.
U.S. Appl. No. 15/935,935, filed Mar. 28, 2017, Michael R. Van de Cotte Ian G. Horn, Determining Quality Of Gas For Rotating Equipment In A Petrochemical Plant Or Refinery.
U.S. Appl. No. 15/935,950, filed Mar. 28, 2017, Michael R. Van de Cotte Ian G. Horn, Determining Quality Of Gas For Rotating Equipment In A Petrochemical Plant Or Refinery.
U.S. Appl. No. 15/935,957, filed Mar. 28, 2017, Michael R. Van de Cotte Ian G. Horn, Using Molecular Weight And Invariant Mapping To Determine Performance Of Rotating Equipment In A Petrochemical Plant Or Refinery.
U.S. Appl. No. 15/937,484, filed Mar. 28, 2017, Sanford A. Victor Phillip F. Daly Ian G. Horn, Detecting And Correcting Maldistribution In Heat Exchangers In A Petrochemical Plant Or Refinery.
U.S. Appl. No. 15/937,499, filed Mar. 28, 2017, Sanford A. Victor Phillip F. Daly Ian G. Horn, Detecting And Correcting Cross-Leakage In Heat Exchangers In A Petrochemical Plant Or Refinery.
U.S. Appl. No. 15/937,517, filed Mar. 28, 2017, Sanford A. Victor Phillip F. Daly Ian G. Horn, Strain Gauges And Detecting Pre-Leakage In Heat Exchangers In A Petrochemical Plant Or Refinery.
U.S. Appl. No. 15/937,535, filed Mar. 28, 2017, Sanford A. Victor Phillip F. Daly Ian G. Horn, Detecting And Correcting Thermal Stresses In Heat Exchangers In A Petrochemical Plant Or Refinery.
U.S. Appl. No. 15/937,588, filed Mar. 28, 2017, Sanford A. Victor Phillip F. Daly Ian G. Horn, Detecting And Correcting Problems In Liquid Lifting In Heat Exchangers.
U.S. Appl. No. 15/937,602, filed Mar. 28, 2017, Sanford A. Victor Phillip F. Daly Ian G. Horn, Air-Cooled Heat Exchangers.
U.S. Appl. No. 15/937,614, filed Mar. 28, 2017, Sanford A. Victor Phillip F. Daly Ian G. Horn, Wet-Cooled Heat Exchanger.
U.S. Appl. No. 15/937,624, filed Mar. 28, 2017, Sanford A. Victor Phillip F. Daly Ian G. Horn, Heat Exchangers In A Petrochemical Plant Or Refinery.
U.S. Appl. No. 15/963,840, filed Apr. 28, 2017, Ryan McCool Chad E. Bjorklund Jorge Charr Luk Verhulst, Remote Monitoring Of Adsorber Process Units.
U.S. Appl. No. 15/972,974, filed Jun. 20, 2017, Jorge Charr Kevin Carnes Ralph Davis Donald A. Eizenga Christina L. Haasser James W. Harris Raul A. Ohaco Daliah Papoutsis, Incipient Temperature Excursion Mitigation And Control.
U.S. Appl. No. 15/979,421, filed May 14, 2018, Mahesh K. Gellaboina Louis A. Lattanzio, Catalyst Transfer Pipe Plug Detection.
U.S. Appl. No. 16/007,669, filed Jun. 28, 2017, Yili Shi Daliah Papoutsis Jonathan Andrew Tertel, Process And Apparatus To Detect Mercaptans In A Caustic Stream.
U.S. Appl. No. 16/011,600, filed Jun. 19, 2017, Theodore Peter Faiella Colin J. Deller Raul A. Ohaco, Remote Monitoring Of Fired Heaters.
U.S. Appl. No. 16/011,614, filed Jun. 19, 2017, Mahesh K. Gellaboina Michael Terry Seth Huber Danielle Schindlbeck, Catalyst Cycle Length Prediction Using Eigen Analysis.
U.S. Appl. No. 16/015,579, filed Jun. 28, 2017, Killol H. Thakkar Robert W. Brafford Eric C. Tompkins, Process And Apparatus For Dosing Nutrients To A Bioreactor.
U.S. Appl. No. 16/133,623, filed Sep. 18, 2017, Chad E. Bjorklund Jeffrey Guenther Stephen Kelley Ryan McCool, Remote Monitoring Of Pressure Swing Adsorption Units.
U.S. Appl. No. 16/140,770, filed Oct. 20, 2017, Dinesh Kumar KN Soumendra Mohan Banerjee, System And Method To Optimize Crude Oil Distillation Or Other Processing By Inline Analysis Of Crude Oil Properties.
U.S. Appl. No. 16/148,763, filed Oct. 2, 2017, Jorge Charr Bryan J. Egolf Dean E. Rende Mary Wier Guy B. Woodle Carol Zhu, Remote Monitoring Of Chloride Treaters Using A Process Simulator Based Chloride Distribution Estimate.
U.S. Appl. No. 16/151,086, filed Oct. 5, 2017, Soumendra Mohan Banerjee Deepak Bisht Priyesh Jayendrakumar Jani Krishna Mani Gautam Pandey, Harnessing Machine Learning & Data Analytics For A Real Time Predictive Model For A Fcc Pre-Treatment Unit.
U.S. Appl. No. 16/154,138, filed Oct. 8, 2018, Raul A. Ohaco Jorge Charr, High Purity Distillation Process Control With Multivariable And Model Predictive Control (Mpc) And Fast Response Analyzer.
U.S. Appl. No. 16/154,141, filed Oct. 8, 2018, Ian G. Horn Zak Alzein Paul Kowalczyk Christophe Romatier, System And Method For Improving Performance Of A Plant With A Furnace.
U.S. Appl. No. 16/215,101, filed Dec. 10, 2018, Louis A. Lattanzio Christopher Schindlbeck, Delta Temperature Control Of Catalytic Dehydrogenation Process Reactors.
U.S. Appl. No. 16/252,021, filed Sep. 16, 2016, Christophe Romatier Zak Alzein Ian G. Horn Paul Kowalczyk David Rondeau, Petrochemical Plant Diagnostic System And Method For Chemical Process Model Analysis.
U.S. Appl. No. 16/253,181, filed Mar. 28, 2017, Ian G. Horn Phillip F. Daly Sanford A. Victor, Detecting And Correcting Vibration In Heat Exchangers.
U.S. Appl. No. 16/363,406, filed Mar. 30, 2018, Louis A. Lattanzio Abhishek Pednekar, Catalytic Dehydrogenation Reactor Performance Index.
Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).
EnergyMEDOR®, Product brochure (Nov. 2014).
Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD==> (Year: 2016).
Lotters, Real-time Composition Determination of Gas Mixtures, [online], 2015, [retrieved on Jun. 19, 2019]. Retrieved from <https://www.ama-science.org/proceedings/getFile/ZwNOZj==> (Year: 2015).
Maybeck, Peter S., "Stochastic models, estimation, and control," vol. 1, Academic Press (1979), 19 pages.

\* cited by examiner

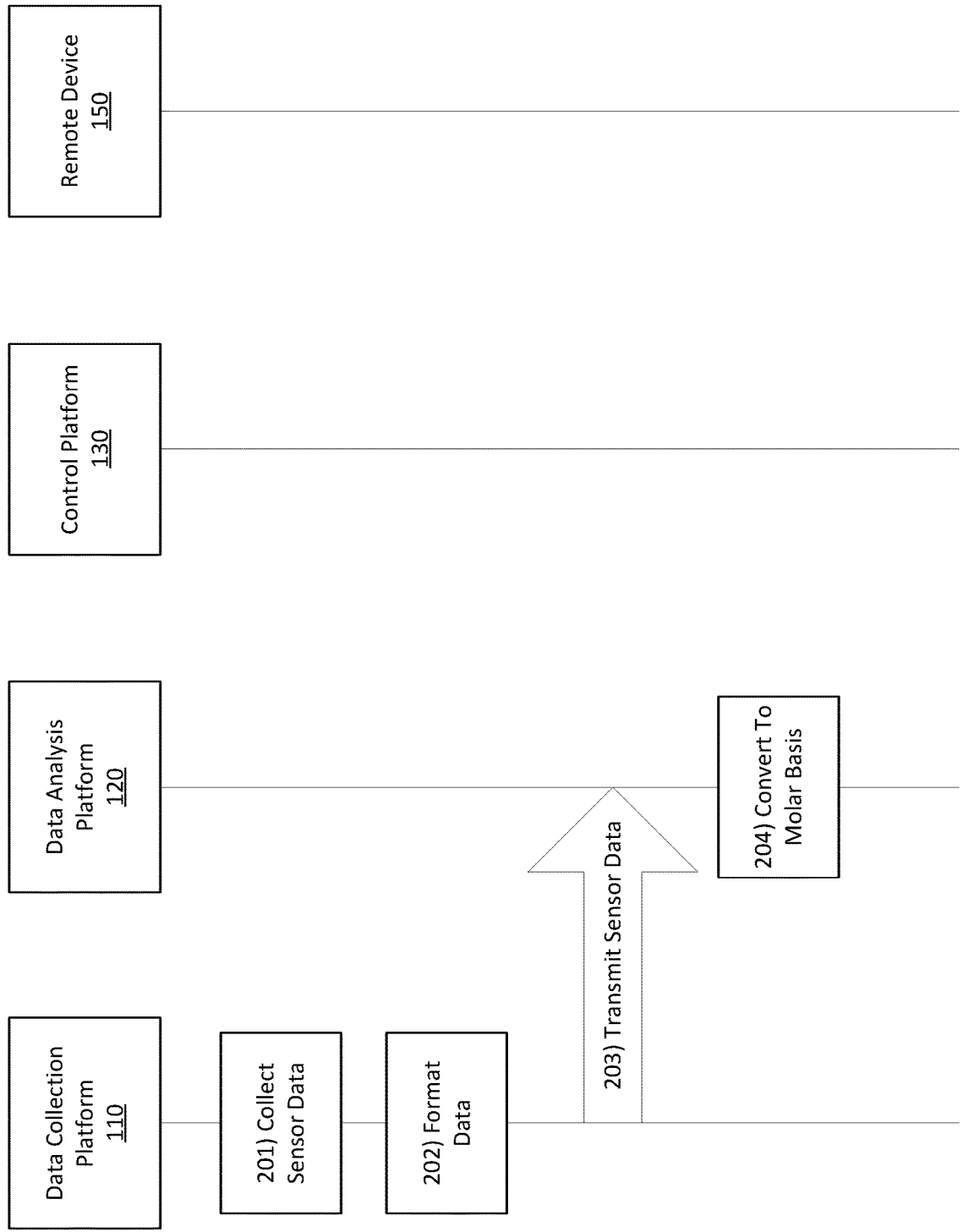

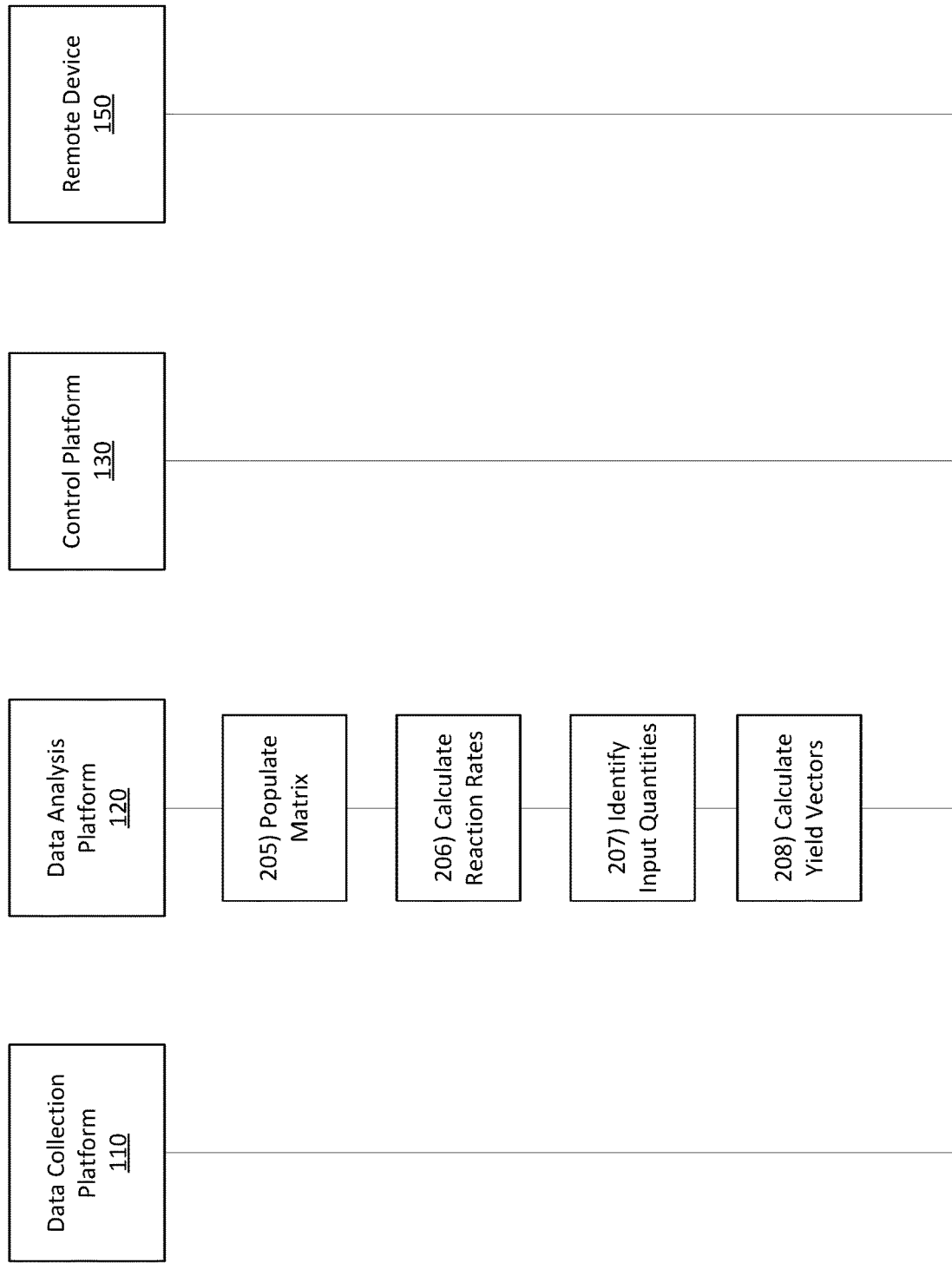

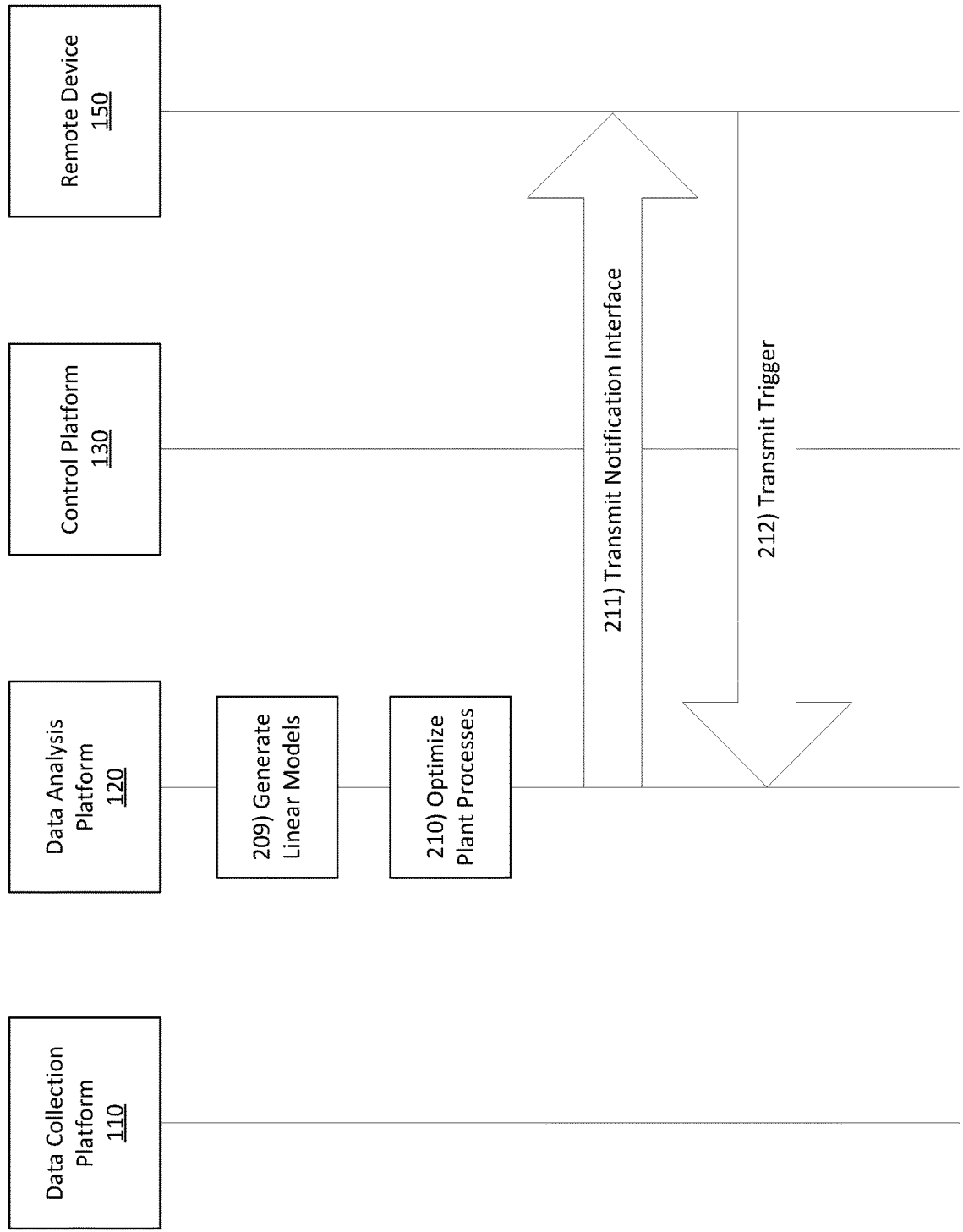

DEVELOPING LINEAR PROCESS MODELS USING REACTOR KINETIC EQUATIONS

FIELD

The disclosure relates generally to a system and method for managing the operation of a plant, such as a chemical plant, petrochemical plant, or refinery, and more particularly to a system and method for developing linear process models to improve the performance of components that make up operations in a plant.

BACKGROUND

In chemical plants, petrochemical plants, and/or refineries, linear process models are utilized to forecast yield data based on factors such as feed data and chemical reactor operative properties. But existing methods for calculating linear process models introduce error that affects the efficacy of the resulting linear process models in forecasting yield results. Accordingly, there will always exist a need for systems and methods for generating linear process models that more accurately predict yield data.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards apparatuses, systems, and methods for developing linear process models using reactor kinetic equations.

In accordance with one or more embodiments, a system may include one or more sensors configured to measure operating information for one or more reactors and a data collection platform including one or more first processors, at least a first communication interface in communication with the one or more sensors, and first non-transitory computer-readable memory storing executable instructions. Through execution of the instructions by the one or more first processors, the data collection platform may be configured to receive sensor data from the one or more sensors, analyze the sensor data to isolate one or more items of particular sensor data, and transmit the one or more items of particular sensor data to a data analysis platform. The system may further include the data analysis platform including one or more second processors, at least a second communication interface, and second non-transitory computer-readable memory storing executable instructions. Through execution of the instructions by the one or more second processors, the data analysis platform may be configured to receive the one or more items of particular sensor data from the data collection platform, generate a linear process model for each of the one or more reactors based on the one or more items of particular sensor data, generate commands for optimizing processing at each of the one or more reactors based on the linear process model for each of the one or more reactors, and transmit the commands for optimizing processing to a control platform associated with each of the one or more reactors. The system may further include the control platform, which may include one or more third processors, at least a third communication interface, and third non-transitory computer-readable memory storing executable instructions. Through execution of the instructions by the one or more third processors, the control platform may be configured to receive the commands for optimizing processing at each of the one or more reactors and adjust at least an element of each of the one or more reactors based on the commands for optimizing processing.

In some embodiments, through execution of the instructions by the one or more second processors, the data analysis platform may be configured to identify reaction outcomes for each molecule within the feed composition based on the populated stoichiometric matrix and calculate reaction rate coefficients for each molecule within the feed composition. Furthermore, execution of the instructions may further cause the data analysis platform to identify convertible quantities for each molecule within the feed composition based on the calculated reaction rate coefficients and calculate yield vectors for each of the one or more reactors based on the calculated reaction rate coefficients and the identified convertible quantities for each molecule within the feed composition, wherein the linear process model for each of the one or more reactors is generated based on the calculated yield vectors and reaction rate coefficients.

In some embodiments, through execution of the instructions by the one or more second processors, the data analysis platform may further be configured to optimize the calculated reaction rate coefficients responsive to calculating the yield vectors for each of the one or more reactors, wherein the optimizing involves identifying reaction rate coefficients that minimize deviation between the calculated yield vectors and the yield data.

In some embodiments, the instructions, when executed, may further cause the data analysis platform to cause at least a first remote device to display a first user interface including a first user interface element for approving the generated commands. The system may further include the first computing device, which may include one or more fourth processors, at least a fourth communication interface, and fourth non-transitory computer-readable memory storing instructions. Through execution of the instructions by the one or more fourth processors, the first computing device may be configured to display the first user interface, receive a selection of the first user interface element for approving the generated commands, and transmit a first trigger to the data analysis platform responsive to receiving the selection, the first trigger indicating the selection of the first user interface element for approving the generated commands.

In some embodiments, transmitting the commands, by the data analysis platform to the control platform, for optimizing processing may be based on the first trigger.

In some embodiments, the instructions, when executed, may further cause the data analysis platform to cause at least a second remote device to in addition to the first remote device, to display a second user interface including a second user interface element for approving the generated commands. The system may further include the second computing device, which may include one or more fifth processors, at least a fifth communication interface, and fifth non-transitory computer-readable memory storing instructions. Through execution of the instructions by the one or more fifth processors, the second computing device may be configured to display the second user interface, receive a selection of the second user interface element for approving the generated commands, and transmit a second trigger to the data analysis platform responsive to receiving the selection, the second trigger indicating the selection of the second user interface element for approving the generated commands.

In some embodiments, transmitting the commands, by the data analysis platform to the control platform, for optimizing processing may be based on the first trigger and the second trigger.

These and additional aspects will be appreciated with the benefit of the disclosures discussed in further detail below.

BRIEF DESCRIPTION OF DRAWINGS

The present disclosure is illustrated by way of example and not limited in the accompanying figures in which like reference numerals indicate similar elements and in which:

FIGS. 2A-2D depict an illustrative flow diagram of one or more steps that one or more devices may perform in controlling one or more aspects of a plant operation in accordance with one or more example embodiments;

DETAILED DESCRIPTION

Figure 1A:
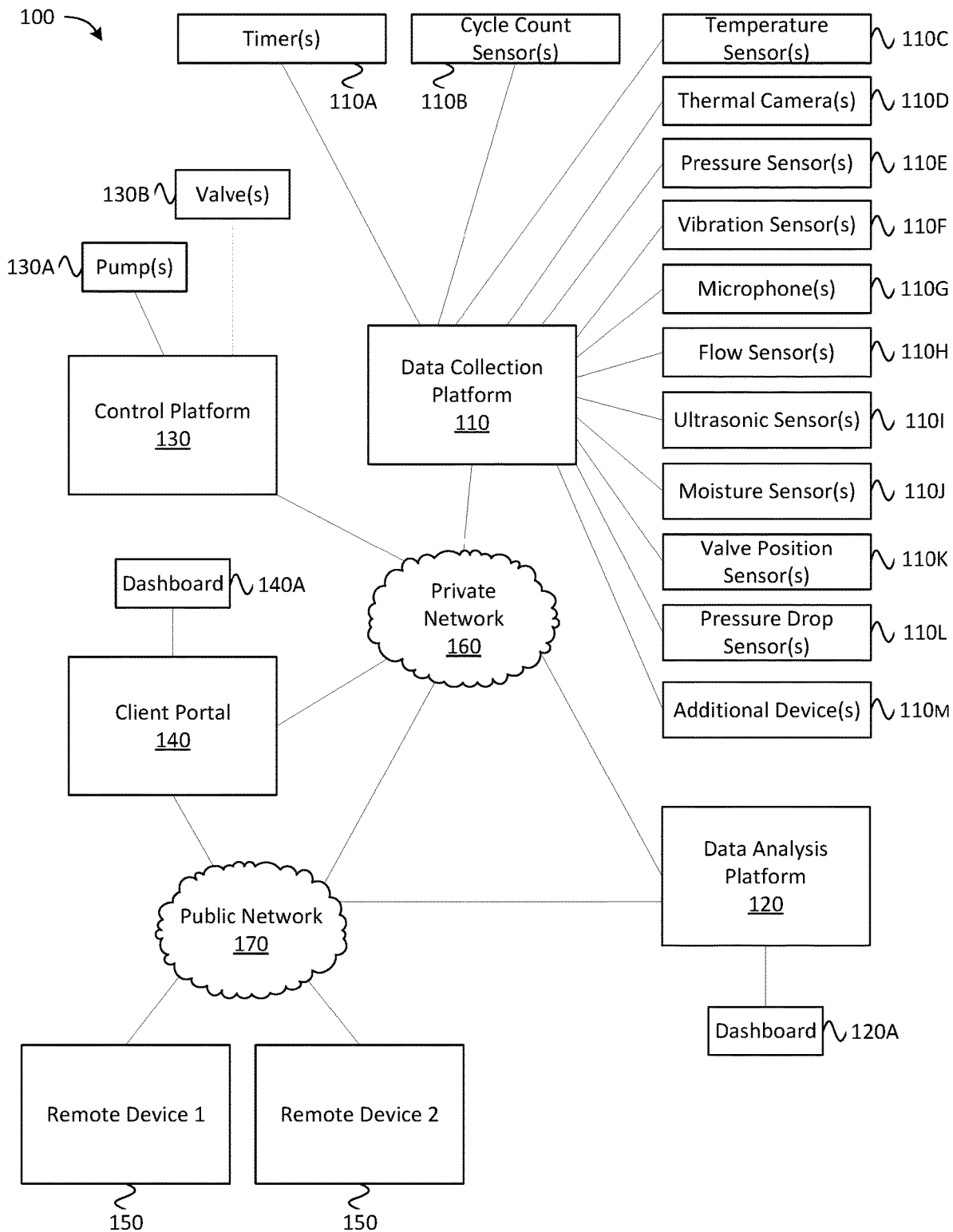
FIG. 1A depicts an illustrative computing environment for managing the operation of one or more pieces of equipment in a plant in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure. Furthermore, it is noted that various connections between elements are discussed in the following description. Such connections are general and, unless specified otherwise, may be direct or indirect, wired or wireless, and that the specification is not intended to be limiting in this respect.

The disclosure provided herein is made in relation to a chemical plant, petrochemical plant, and/or refinery that may include one or more pieces of equipment that process one or more input chemicals to create one or more products. References herein to a "plant" are to be understood to refer to any of various types of chemical and petrochemical manufacturing or refining facilities. References herein to plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

As will be described in greater detail below, the present disclosure is directed to a system and method for the development of linear process models using reactor kinetic equations. Through the utilization of the developed linear process models, the present disclosure is further directed to a system for improving, calibrating, and/or optimizing plant processes for manufacturing products from one or more input chemicals. The system may be configured to interpret data and/or generate recommendations regarding what actions may be performed to improve plant performance. These actions may include modifications to reactor, process flow, and/or reaction conditions.

The present disclosure provides a technological improvement to rudimentary linear program modeling processes, which may use generic regression techniques and may yield poor recommendations that are not generated with the accuracy, modularity, and dynamic alterability required by modern refinery infrastructure. In particular, the present disclosure provides a system and method for developing linear process models using reactor kinetic equations based on real-time yield and composition results, feed properties and compositions, processing conditions, and/or fundamental chemistry. In doing so, the system and method may produce linear process models that provide a technological improvement to rudimentary linear program modeling processes by enabling greater accuracy, modularity, and/or dynamic alterability.

The system may rely on sensing and/or measuring various parameters including flow concentrations and rates into and out of a reactor, temperature, pressure, and/or other performance characteristics associated with the reactor to predict reaction kinetics. One or more automated algorithms and/or programmatic engines may be used to incorporate sensor and/or measurement device data in reactor kinetic equations to develop linear process models that may be used in improving, calibrating, and/or optimizing plant processes while minimizing the need for operator review. In particular, rates and compositions of feed and product may be identified by one or more sensor and/or measurement devices. A converter engine at a computing device may take mass-based feed and product yields and convert such data to a molar basis. Based on the molar-based feed data, a prediction engine at the computing device may use one or more stoichiometric matrices and/or differential equations (e.g., Arrhenius equations) to identify molar and mass solutions for each feed component and predict the yield for reaction rates on a component-by-component basis. A modeling engine (e.g., at the computing device) may adjust reaction rate coefficients to minimize the deviation between the molar-based yield results generated by the prediction engine and the yield registered by system sensors and/or measuring devices in order to produce one or more linear process models. The resulting linear process models may be utilized by an optimization engine at the computing device to optimize plant processes in order to minimize reaction waste and maximize reaction yield.

The system may include one or more computing devices or platforms for collecting, storing, processing, and analyzing data from one or more sensors. FIG. 1A depicts an illustrative computing system that may be implemented at one or more components, pieces of equipment (e.g., reactors), and/or plants. FIGS. 1A-1E show, by way of illustration, various components of the illustrative computing system in which aspects of the disclosure may be practiced. Other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or a combination thereof, and the specification is not intended to be limiting in this respect.

FIG. 1A depicts an illustrative operating environment 100 in which various aspects of the present disclosure may be implemented in accordance with example embodiments. Computing system environment 100 illustrated in FIG. 1A is only one example of a suitable computing environment and is not intended to suggest any limitation as to the scope of use or functionality contained in the disclosure. Computing system environment 100 may include various sensor, measurement, and/or data capture systems, such as a data collection platform 110, a data analysis platform 120, a control platform 130, a client portal 140, one or more networks (e.g., private network 160 and public network 170), one or more remote devices 150 (e.g., remote device 1 and remote device 2), and/or one or more other elements. For example, data collection platform 110 may be communicatively coupled to timer(s) 110A, cycle count sensor(s) 110B, temperature sensor(s) 110C, thermal camera(s) 110D, pressure sensor(s) 110E, vibration sensor(s) 110F, microphone(s) 110G, flow sensor(s) 110H, ultrasonic sensor(s) 110I, moisture sensor(s) 110J, valve position sensor(s) 110K, and/or pressure drop sensor(s) 110L (e.g., sensor devices 110A-110L), as well as additional measurement device(s) 110M, data analysis platform 120 may be communicatively coupled to dashboard 120A, control platform 130 may be communicatively coupled to pump(s) 130A and valve(s) 130B, and client portal 140 may be communicatively coupled to dashboard 140A.

The numerous elements of the computing system environment 100 of FIG. 1A may be communicatively coupled through one or more networks. For example, the numerous platforms, devices, sensors, and/or components of the computing system environment 100 may be communicatively coupled through private network 160. Private network 160 may include, in some examples, a network firewall device to prevent unauthorized access to the data and devices on private network 160. Alternatively, private network 160 may be isolated from external access through physical means, such as a hard-wired network with no external, direct-access point. The data communicated on private network 160 may optionally be encrypted for further security. Depending on the frequency of collection and transmission of sensor measurements and other data from timer(s) 110A, cycle count sensor(s) 110B, temperature sensor(s) 110C, thermal camera(s) 110D, pressure sensor(s) 110E, vibration sensor(s) 110F, microphone(s) 110G, flow sensor(s) 110H, ultrasonic sensor(s) 110I, moisture sensor(s) 110J, valve position sensor(s) 110K, pressure drop sensor(s) 110L, and/or additional measurement device(s) 110M to data collection platform 110, data analysis platform 120, control platform 130, client portal 140, and/or remote devices 150, private network 160 may experience large bandwidth usage and be technologically designed and arranged to accommodate for such technological issues.

Moreover, the computing system environment 100 may also include public network 170 that may be accessible to remote devices 150 (e.g., remote device 1 and remote device 2). In some examples, remote devices 150 may be located not in the proximity (e.g., more than one mile away) of the various sensor, measurement, and data capture systems illustrated in FIG. 1A. In other examples, remote devices 150 may be physically located inside a plant, but restricted from access to private network 160. In other words, the adjective "remote," need not necessarily require the device to be located at a great distance from the sensor systems and other components.

Although the computing system environment 100 of FIG. 1A illustrates logical block diagrams of numerous platforms and devices, the disclosure is not so limited. In particular, one or more of the logical boxes in FIG. 1A may be combined into a single logical box or the functionality performed by a single logical box may be divided across multiple existing or new logical boxes. For example, aspects of the functionality performed by data collection platform 110 may be incorporated into one or each of timer(s) 110A, cycle count sensor(s) 110B, temperature sensor(s) 110C, thermal camera(s) 110D, pressure sensor(s) 110E, vibration sensor(s) 110F, microphone(s) 110G, flow sensor(s) 110H, ultrasonic sensor(s) 110I, moisture sensor(s) 110J, valve position sensor(s) 110K, pressure drop sensor(s) 110L, and/or additional measurement device(s) 110M illustrated in FIG. 1A. As such, the data collection may occur local to one or each of the respective the sensor devices 110A-110L and/or additional measurement device(s) 110M, which may communicate directly with one or more of data analysis platform 120 and/or control platform 130. Such an embodiment is contemplated by FIG. 1A. Moreover, in such an embodiment, one or each of the sensor devices 110A-110L and/or additional measurement device(s) 110M may measure values respectively common to the sensor type, but may also filter the measurements so that only values that are statistically relevant and/or of-interest to computing system environment 100 are transmitted to data analysis platform 120 and/or control platform 130. As a result, each of the sensor devices 110A-110L and/or additional measurement device(s) 110M may include a processor (or other circuitry that enables execution of computer instructions) and a memory to store those instructions and/or filtered data values. The processor may be embodied as an application-specific integrated circuit (ASIC), FPGA, or other hardware or software-based module for execution of instructions.

In another example, sensor devices 110A-110L and/or additional measurement device(s) 110M illustrated in FIG. 1A may be combined into an enhanced, multi-purpose sensor system. Such a combined sensor system may provide economies of scale with respect to hardware components such as processors, memories, communication interfaces, and others.

In yet another example, data collection platform 110 and data analysis platform 120 may reside on a single server computer or virtual machine and be depicted as a single, combined logical box on a system diagram. Moreover, a data store may be illustrated in FIG. 1A separate and apart from data collection platform 110 and data analysis platform 120 to store a large amount of values collected from sensor devices 110A-110L and/or additional measurement device(s) 110M, as well as other components. The data store may be embodied in a database format and may be made accessible to public network 170. Meanwhile, data collection platform 110, data analysis platform 120, and control platform 130 may be restricted to private network 160 and left inaccessible to public network 170. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices 150 over public network 170.

Referring to FIG. 1A, process measurements from sensors 110A-110L and/or additional measurement device(s) 110M may be used to monitor conditions in, around, and on process equipment (e.g., reactors, separators, feed systems, and the like). Additional measurement device(s) 110M may include, but are not limited to, differential pressure sensors, thermal cameras and skin thermocouples, chemical sensors, capacitance sensors, weight sensors, gas chromatographs, position sensors, timing sensors, vibration sensors, level sensors, liquid level (hydraulic fluid) sensors, and other sensors commonly found in the refining and petrochemical industry. Further, process laboratory measurements may be taken using gas chromatographs, liquid chromatographs, distillation measurements, octane measurements, and other laboratory measurements. System operational measurements also can be taken to correlate the system operation to the reactor measurements. In addition, sensor devices 110A-110L and/or the additional measurement device(s) 110M may include transmitters and deviation alarms, which may be programmed to set off an alarm producing an audible and/or visual effect.

As stated above, sensor data may be collected by data collection platform 110. Sensors 110A-110L and/or additional measurement devices 110M may interface with data collection platform 110 via wired or wireless transmissions. Sensor data may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. Data collection platform 110 may continuously or periodically (e.g., every second, every minute, every hour, every day, once a week, once a month) transmit collected sensor data to data analysis platform 120, which may be nearby or remote from data collection platform 110.

In some instances, additional measurement device(s) 110M may transmit signals to a processor or a hub that collects the data and sends to a processor. For example, temperature and pressure measurements may be sent to a hub (e.g., data collection platform 110). In one example, temperature sensors may include thermocouples, fiber optic temperature measurement, thermal cameras, and/or infrared cameras. Skin thermocouples may be applied to a wall of a reactor. A shielded (e.g., insulated) tube skin thermocouple assembly may be used to obtain accurate measurements. One example of a thermocouple may be a removable XTRACTO-Pad. A thermocouple can be replaced without any additional welding. Clips and/or pads may be used for ease of replacement. Fiber Optic cable can be attached to a unit, line, or vessel to provide a complete profile of temperatures.

Furthermore, flow sensors may be used in flow paths such as the inlet to the path, outlet from the path, or within the path. Flow may be determined by pressure-drop across a known resistance, such as by using pressure taps. Other types of flow sensors include, but are not limited to, ultrasonic, turbine meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

A gas chromatograph on the feed or product streams into and out of the reactor can be used to speciate the various components to provide empirical data to be used in calculations.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species (HCl, RCl), oxygen, hydrogen, and/or water (moisture). Chemical sensors may use gas chromatographs, liquid chromatographs, distillation measurements, and/or octane measurements. In another example, equipment information, such as wear, efficiency, production, state, or other condition information, may be gathered and determined based on sensor data.

Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to continue to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below.

Monitoring the reaction process includes collecting data that can be correlated and used to generate linear process models to predict reaction behavior and/or problems in different reactors used in the same plant or in other plants. Data collected from the various sensors (e.g., measurements such as flow, pressure drop, thermal performance, and the like) may be correlated with external data. Process changes or operating conditions may be able to be altered to preserve the equipment until the next scheduled maintenance period. Fluids may be monitored for corrosive contaminants and pH may be monitored in order to predict reaction chemistry. At a high level, sensor data collected (e.g., by data collection platform 110) and data analysis performed (e.g., by data analysis platform 120) may be used together, for example, for process simulation, equipment simulation, linear process model generation, and/or other tasks. For example, sensor data may be used for generation of linear process models. The linear process models may provide a computational basis for assessing system performance and yield results under variance in input parameters. Through the simulation of the linear process models under varying input parameters and reactor operative conditions, improvement, calibration, and/or optimization of plant processes for yielding products from one or more input chemicals may be achieved.

Figure 1B:
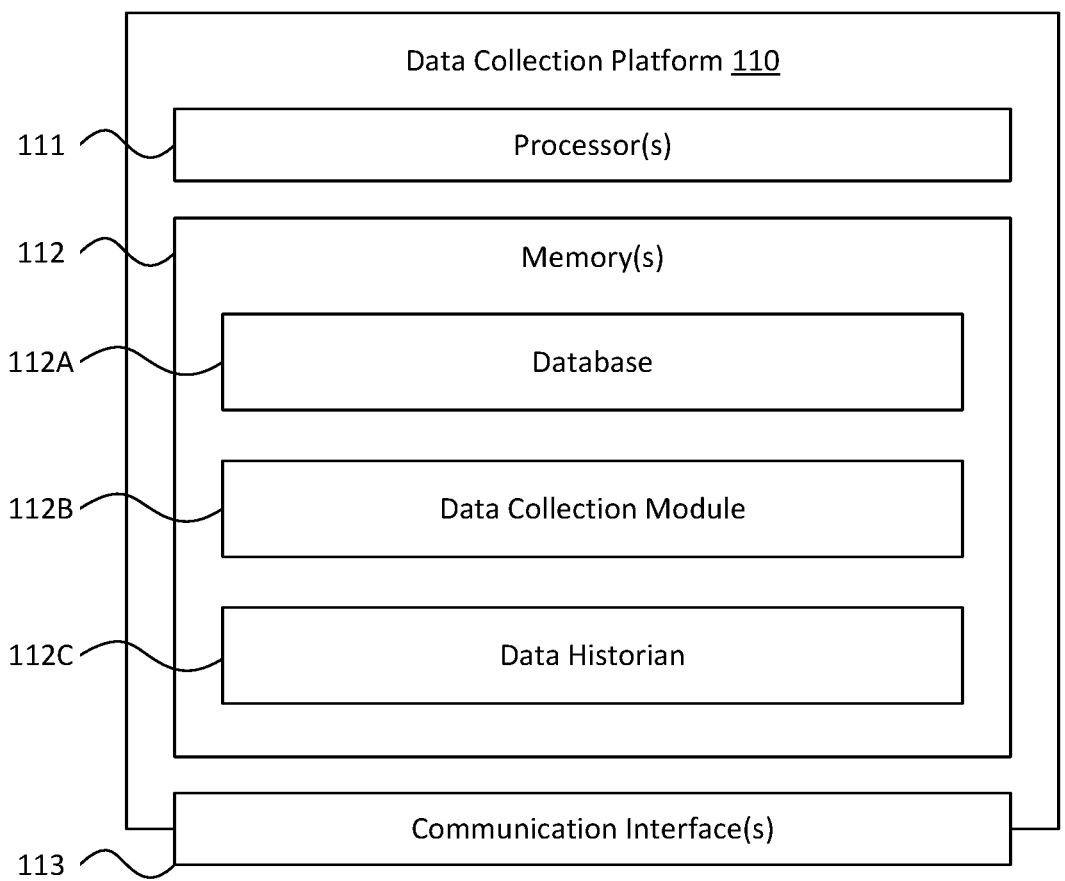
FIG. 1B depicts an illustrative data collection computing platform for collecting data related to the operation of one or more pieces of equipment in a plant in accordance with one or more example embodiments.
Figure 1C:
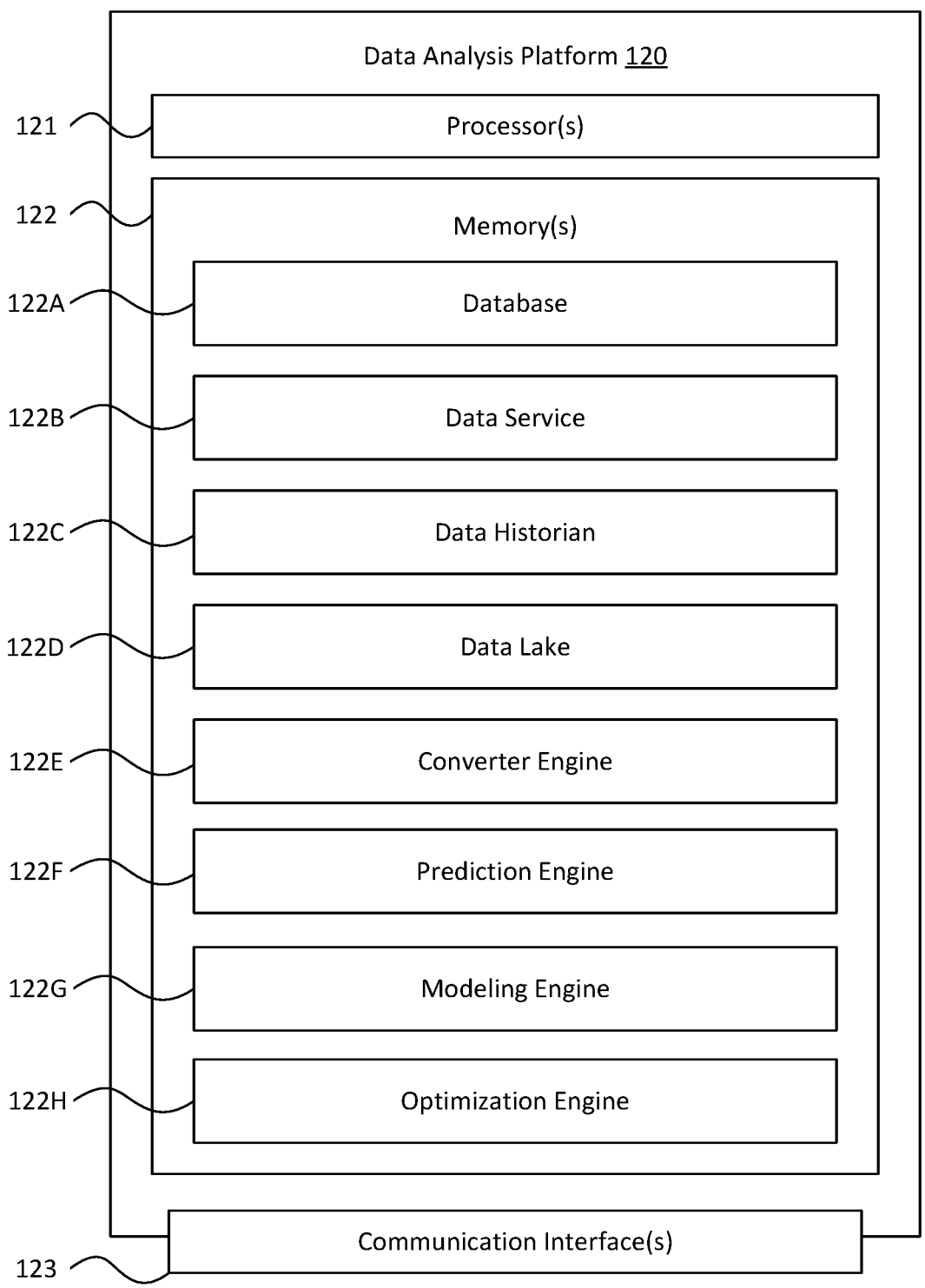
FIG. 1C depicts an illustrative data analysis computing platform for analyzing data related to the operation of one or more pieces of equipment in a plant in accordance with one or more example embodiments.
Figure 1D:
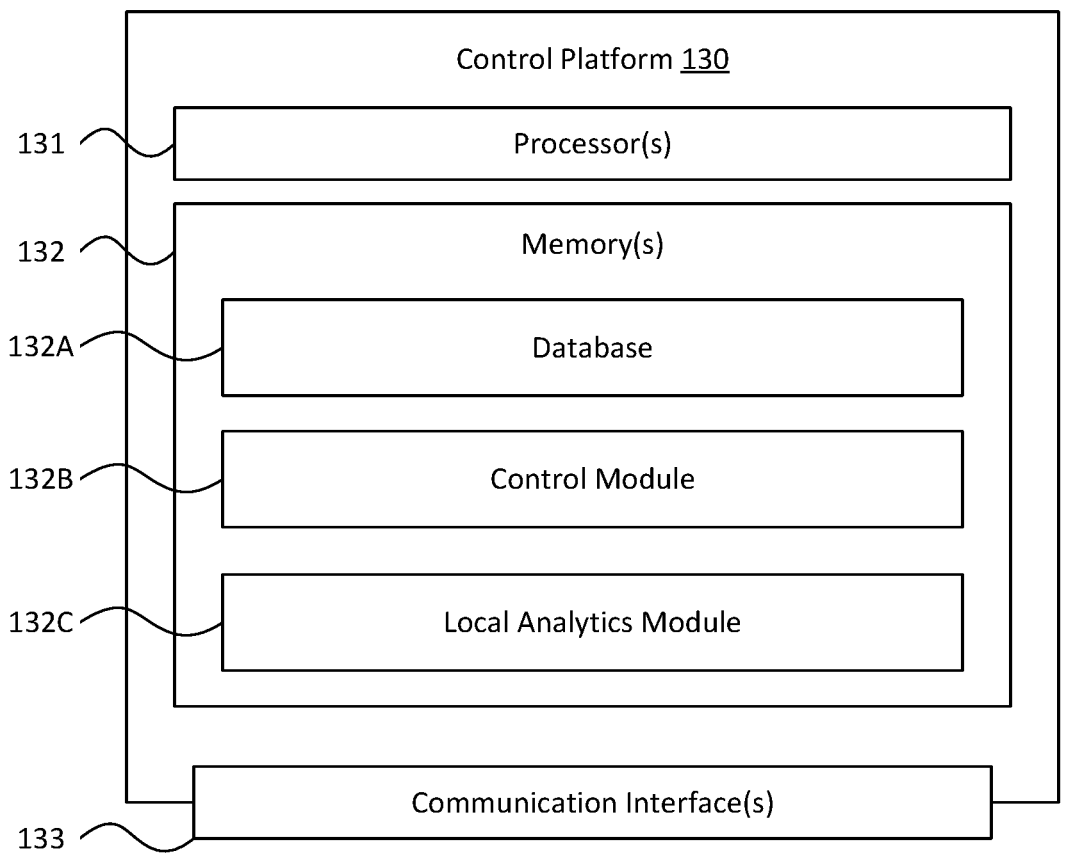
FIG. 1D depicts an illustrative control computing platform for controlling the operation of one or more pieces of equipment in a plant in accordance with one or more example embodiments.
Figure 1E:
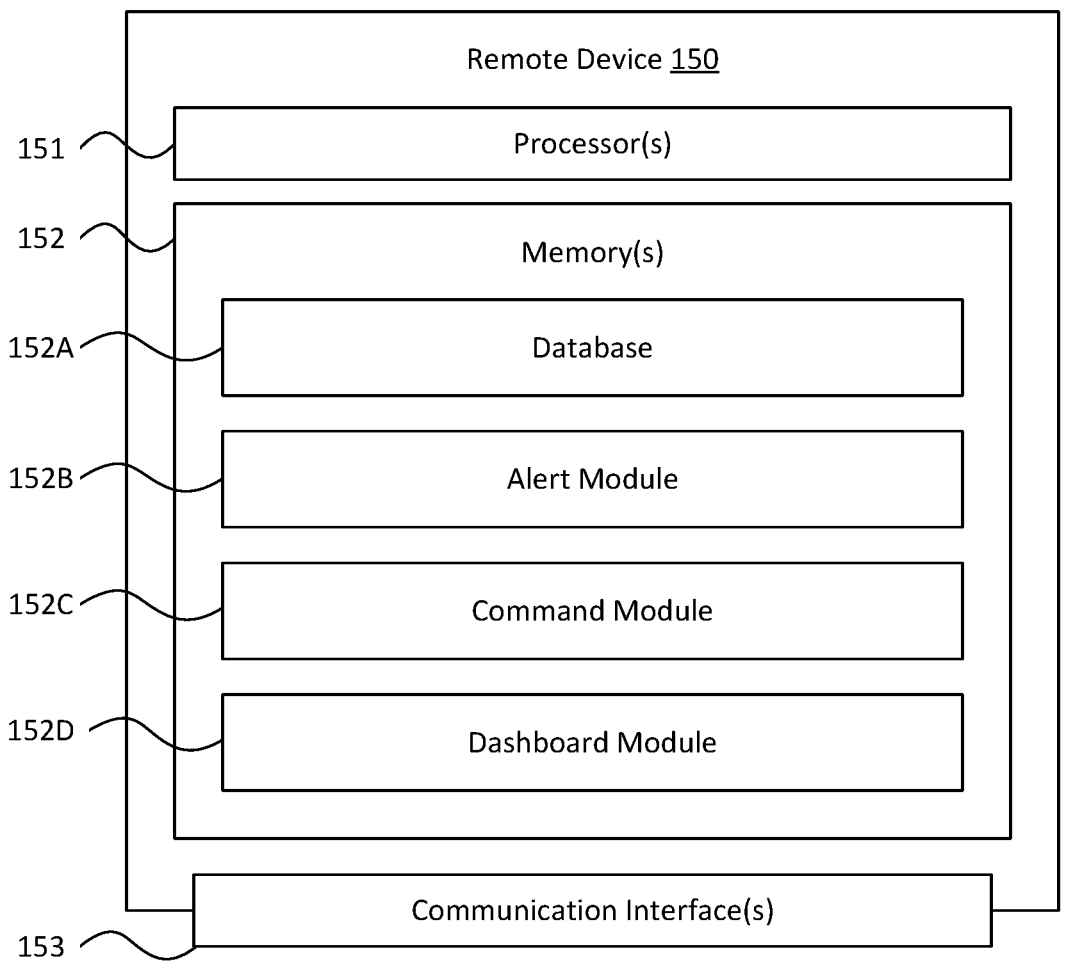
FIG. 1E depicts an illustrative remote computing device for receiving and sending alerts and information related to the operation of one or more pieces of equipment in a plant in accordance with one or more example embodiments.

Computing system environment 100 of FIG. 1A includes logical block diagrams of numerous platforms and devices that are further elaborated upon in FIGS. 1B, 1C, 1D, and 1E. For example, FIG. 1B depicts an illustrative data collection platform 110, FIG. 1C depicts an illustrative data analysis platform 120, FIG. 1D depicts an illustrative control platform 130, and FIG. 1E depicts an illustrative remote device 150.

These platforms and devices of may include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, virtual machines, distributed computing environments that include any of the above systems or devices, and the like.

In addition, the platform and/or devices in FIGS. 1A-1E may include one or more memories of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database. Alternatively or additionally, a module may be implemented in a virtual machine or multiple virtual machines.

Furthermore, the platform and/or devices in FIGS. 1A-1E may include one or more communication interfaces including, but not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, and other protocols.

In some examples, one or more sensor devices 110A-110L and/or additional measurement device(s) 110M in FIG. 1A may be enhanced by incorporating functionality that may otherwise be found in a data collection platform such as data collection platform 110. These enhanced sensor system may provide further filtering of the measurements and readings collected from their sensor devices. For example, with some of the enhanced sensor systems in operating environment 100 illustrated in FIG. 1A, an increased amount of processing may occur at the sensor so as to reduce the amount of data needing to be transferred over a private network in real-time to a computing platform. The enhanced sensor system may filter at the sensor itself the measured/collected/captured data and only particular, filtered data may be transmitted to data collection platform 110, data analysis platform 120, control platform 130, and/or one or more of remote devices 150 for storage and/or analysis.

Referring to FIG. 1B, in one example, a data collection platform 110 may include one or more processor(s) 111, one or more memories 112, and one or more communication interface(s) 113. One or more memories 112 may include a database 112A for storing data records of various values collected from one or more sources including one or more sensors 110A-110L and/or additional measurement device(s) 110M. Additionally, one or more memories 112 may further include a data collection module 112B and a data historian 112C.

Data collection module 112B may be stored in memories 112 and assist processor(s) 111 of data collection platform 110 in communicating with, via communication interface(s) 113, one or more sensor, measurement, and data capture systems, and processing the data received from these sources. In some embodiments, data collection module 112B may include computer-executable instructions that, when executed by processor(s) 111, cause data collection platform 110 to perform one or more of the steps disclosed herein. In other embodiments, data collection module 112B may be a hybrid of software-based and/or hardware-based instructions to perform one or more of the steps disclosed herein. In some examples, data collection module 112B may assist an enhanced sensor system with further filtering of measurements and readings collected from one or more sensors 110A-110L and/or additional measurement device(s) 110M. In some examples, the data collection module 112B may receive some or all data from a plant or piece of equipment, and/or may provide that data to one or more other modules or servers.

Data collection platform 110 may include or be in communication with data historian 112C. Data historian 112C may be implemented as one or more software modules, one or more virtual machines, and/or one or more hardware elements (e.g., servers). Data historian 112C may collect data at regular intervals (e.g., every minute, every two minutes, every ten minutes, every thirty minutes, and so on). Data historian 112C may include or be in communication with one or more software modules, one or more virtual machines, or one or more hardware elements (e.g., servers) configured to work with or in place of data collection module 112B to handle one or more aspects of data replication.

Although the elements of FIG. 1B are illustrated as logical block diagrams, the disclosure is not so limited. In particular, one or more of the logical boxes in FIG. 1B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 112A in FIG. 1B is illustrated as being stored inside one or more memories 112 of data collection platform 110, FIG. 1B contemplates that database 112A may be stored in a standalone data store communicatively coupled to data collection module 112B and processor(s) 111 of data collection platform 110 via communications interface(s) 113 of data collection platform 110.

In addition, data collection module 112B may assist processor(s) 111 of data collection platform 110 in communicating with, via communications interface(s) 113, one or more platforms and/or devices in FIG. 1A (e.g., one or more sensors 110A-110L, additional measurement device(s) 110M, data analysis platform 120, control platform 130, client portal 140, remote devices 150, and so on). Furthermore, data collection module 112B may aid processor(s) 111 of data collection platform 110 in processing data received from other sources, such as data feeds from third-party servers and manual entry at the field site from a dashboard graphical user interface.

For example, a third-party server may provide contemporaneous weather data to data collection module 112B of data collection platform 110. Some elements of chemical, petrochemical, and/or refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may include pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 1C, in one example, a data analysis platform 120 may include one or more processor(s) 121, one or more memories 122, and one or more communication interface(s) 123. One or more memories 122 may include a database 122A for storing data records of various values collected from one or more sources including, but not limited to, one or more sensors 110A-110L, additional measurement device(s) 110M, data collection platform 110, control platform 130, client portal 140, remote devices 150, and so on. Additionally, one or more memories 112 of data analysis platform 120 may further include a data collection service 122B, data historian 122C, data lake 122D, converter engine 122E, prediction engine 122F, modeling engine 122G, and/or optimization engine 122H.

In some instances, database 122A may be the same database as that depicted in FIG. 1B and data analysis platform 120 may communicatively couple with database 112A of data collection platform 110 via communication interface(s) 123. At least one advantage of sharing a database between the two platforms is the reduced memory requirements due to not duplicating the same or similar data.

Further, data analysis platform 120 may include data service 122B. In some embodiments, data service 122B may include computer-executable instructions that, when executed by processor(s) 121, cause data analysis platform 120 to perform one or more of the steps disclosed herein. In other embodiments, data service 122B may be a virtual machine. In some embodiments, data service 122B may be a hybrid of software-based and/or hardware-based instructions to perform one or more of the steps disclosed herein. Additionally and/or alternatively, data service 122B may include computer-executable instructions that, when executed by processor(s) 121, cause data analysis platform 120 to perform one or more functions similar to those described above in regard to data collection module 112B of data collection platform 110. As such, data service 122B may enable data analysis platform 120 to interface with one or more sensors 110A-110L, additional measurement device(s) 110M, and/or other devices and perform filtering of the measurements and readings collected from one or more sensor devices 110A-110L, additional measurement device(s) 110M, and/or other devices.

Also, data analysis platform 120 may include data historian 122C. In some embodiments, data historian 122C may include computer-executable instructions that, when executed by processor(s) 121, cause data analysis platform 120 to perform one or more of the steps disclosed herein. In other embodiments, data historian 122C may be a virtual machine. In some embodiments, data historian 122C may be a hybrid of software-based and/or hardware-based instructions to perform one or more of the steps disclosed herein. Data historian 122C may collect data at regular intervals (e.g., every minute, every two minutes, every ten minutes, every thirty minutes) from data collection platform 110 and/or one or more sensor devices 110A-110L, additional measurement device(s) 110M, and/or other devices. Additionally and/or alternatively, data historian 122C may include computer-executable instructions that, when executed by processor(s) 121, cause data analysis platform 120 to perform one or more functions similar to those described above in regard to data historian 112C of data collection platform 110.

Additionally, data analysis platform 120 may include data lake 122D. In some embodiments, data lake 122D may include computer-executable instructions that, when executed by processor(s) 121, cause data analysis platform 120 to perform one or more of the steps disclosed herein. In other embodiments, data lake 122D may be a virtual machine. In some embodiments, data lake 122D may be a hybrid of software-based and/or hardware-based instructions to perform one or more of the steps disclosed herein. Data lake 122D may perform relational data storage. Data lake 122D may provide data in a format that may be useful for processing data and/or performing data analytics.

Moreover, data analysis platform 120 may include converter engine 122E, prediction engine 122F, modeling engine 122G, and/or optimization engine 122H. In some embodiments, converter engine 122E, prediction engine 122F, modeling engine 122G, and/or optimization engine 122H may include computer-executable instructions that, when executed by processor(s) 121, cause data analysis platform 120 to perform one or more of the steps disclosed herein. In other embodiments, converter engine 122E, prediction engine 122F, modeling engine 122G, and/or optimization engine 122H may be one or more virtual machines. In some embodiments, converter engine 122E, prediction engine 122F, modeling engine 122G, and/or optimization engine 122H may be a hybrid of software-based and/or hardware-based instructions to perform one or more of the steps disclosed herein. Converter engine 122E, prediction engine 122F, modeling engine 122G, and/or optimization engine 122H may store instructions which, when executed, cause data analysis platform 120 to perform a series of collaborative operations in the generation and usage of the linear process models described herein. For example, converter engine 122E may receive mass-based feed data and product yield data and convert such data to a molar basis. Prediction engine 122F may use one or more stoichiometric matrices and/or differential equations, based on molar-based feed data and product yield data, to identify molar and mass solutions for each feed component and predict yield for reaction rates on a component-by-component basis. Modeling engine 122G may adjust reaction rate coefficients to minimize the deviation between the molar-based yield results generated by the prediction engine and the yield data registered by system sensors and/or measuring devices and, based on the adjusted reaction rate coefficients, produce one or more linear process models. Optimization engine 122H may use the resulting linear process models (e.g., from modeling engine 122G) to optimize plant processes in order to minimize reaction waste and/or maximize reaction yield.

One or more components of data analysis platform 120 may assist processor(s) 121 of data analysis platform 120 in processing and analyzing the data values stored in database 122A. In some embodiments, data analysis platform 120 may perform statistical analysis, predictive analytics, and/or machine learning on the data values in the database to generate predictions and linear process models. For example, data analysis platform 120 may compare temperature data from different dates to determine if changes are occurring. Such comparisons may be made on a monthly, weekly, daily, hourly, real-time, or some other basis.

Referring to FIG. 1C, data analysis platform 120 may generate recommendations for adjusting one or more parameters for the operation of the plant environment depicted in FIG. 1A. In some embodiments, data analysis platform 120 may, based on the linear process models, generate command codes that may be transmitted, via communications interface(s) 123, to cause adjustments of one or more operations in the plant environment. The command codes may be transmitted to control platform 130 for processing and/or execution. In an alternative embodiment, the command codes may be directly communicated, either wirelessly or in a wired fashion, to physical components at the plant, where the physical components include an interface to receive the commands and execute them.

Although the elements of FIG. 1C are illustrated as logical block diagrams, the disclosure is not so limited. In particular, one or more of the logical boxes in FIG. 1C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 122A is visually depicted in FIG. 1C as being stored inside one or more memories 122 of data analysis platform 120, FIG. 1C contemplates that database 122A may be stored in a standalone data store communicatively coupled to processor(s) 121 of data analysis platform 120 via communication interface(s) 123 of data analysis platform 120.

Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations, generate linear process models, and perform optimization analysis of plant processes based on the linear process models.

Referring to FIG. 1D, in one example, a control platform 130 may include one or more processor(s) 131, one or more memories 132, and one or more communication interface(s) 133. One or more memories 132 may include database 132A for storing data records of various values transmitted from a user interface, computing device, or other platform. The values may include parameter values for particular equipment at the plant. For example, some illustrative equipment at the plant that may be configured and/or controlled by control platform 130 include, but is not limited to, a feed switcher, sprayer, one or more valves, one or more pumps, one or more gates, and/or one or more drains. Control platform 130 may receive instructions from data analysis platform 120 (e.g., optimization engine 122H) to configure and/or control one or more pieces of equipment at the plant as part of an optimization of one or more plant processes in order to minimize reaction waste and/or maximize reaction yield.

In addition, control module 132B may be stored in one or more memories 132 and may assist one or more processor(s) 131 of control platform 130 in receiving, storing, and transmitting the data values stored in database 132A. In some embodiments, control module 132B may include computer-executable instructions that, when executed by processor(s) 131, cause control platform 130 to perform one or more of the steps disclosed herein. In other embodiments, control module 132B may be a hybrid of software-based and/or hardware-based instructions to perform one or more of the steps disclosed herein.

Further, control platform 130 may include local analytics module 132C. In some embodiments, local analytics module 132C may include computer-executable instructions that, when executed by processor(s) 131, cause local analytics module 132C to perform one or more of the steps disclosed herein. In other embodiments, local analytics module 132C may be a virtual machine. In some embodiments, local analytics module 132C may be a hybrid of software-based and/or hardware-based instructions to perform one or more of the steps disclosed herein. Local analytics module 132C may assess data related to plant operations, in some instances in real-time, in order to ensure safety of plant operations. In the event that plant operations data indicates unsafe operating conditions, local analytics module 132C may operate in concert with control module 132B to alter and/or shutdown plant operations.

In a plant environment, such as illustrated in FIG. 1A, if sensor data is outside of a safe range, this may be cause for immediate danger. As such, there may be a real-time component to the system such that the system processes and responds in a timely manner. Although in some embodiments, data could be collected and analyzed over a period of months, numerous embodiments contemplate a real-time or near real-time responsiveness in analyzing and generating alerts, such as those generated or received by the alert module in FIG. 1E.

Referring to FIG. 1E, in one example, remote device 150 may include one or more processor(s) 151, one or more memories 152, and one or more communication interface(s) 153. In some instances, remote device 150 may be similar to one or more of remote device 1 and remote device 2 as described above in regard to FIG. 1A. One or more memories 152 may include database 152A for storing data records of various values entered by a user or received through communications interface(s) 153. In addition, an alert module 152B, command module 152C, and/or dashboard module 152D may be stored in one or more memories 152 and assist processor(s) 151 of remote device 150 in processing and analyzing the data values stored in database 152A.

In some embodiments, the aforementioned modules may include computer-executable instructions that, when executed by processor(s) 151, cause remote device 150 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through communications interface(s) 153. The values may indicate a dangerous condition or even merely a warning condition due to odd sensor readings. Command module 152C of remote device 150 may generate a command that, when transmitted through communications interface(s) 153 to the platforms at the plant, causes adjusting of one or more parameter operations of the plant environment depicted in FIG. 1A. In some embodiments, dashboard module 152D may display a graphical user interface to a user of remote device 150 to enable the user to enter desired parameters and/or commands. These parameters/commands may be transmitted to command module 152C to generate the appropriate resulting command codes that may be then transmitted, via communications interface(s) 153, to cause adjustments or halting/starting of one or more operations in the plant environment. The command codes may be transmitted to control platform 130 for processing and/or execution. In an alternative embodiment, the command codes may be directly communicated, either wirelessly or in a wired fashion, to physical components at the plant such that the physical components include an interface to receive the commands and execute them.

Although FIG. 1E is not so limited, in some embodiments remote device 150 may include a desktop computer, a smartphone, a wireless device, a tablet computer, a laptop computer, and/or the like. Remote device 150 may be physically located locally or remotely, and may be connected by one of communications links to public network 170 that is linked via a communications link to private network 160 as depicted in FIG. 1A. The network used to connect remote device 150 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 1E are illustrated as logical block diagrams, the disclosure is not so limited. In particular, one or more of the logical boxes in FIG. 1E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 152A is visually depicted in FIG. 1E as being stored inside one or more memories 152 in remote device 150, FIG. 1E contemplates that database 152A may be stored in a standalone data store communicatively coupled, via communications interface(s) 153, to the modules stored at remote device 150 and processor(s) 151 of remote device 150.

Referring to FIGS. 1A-1E, in some examples, the performance of operation in a plant may be improved by using a cloud computing infrastructure and associated methods, as described in U.S. Patent Application Publication No. 2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies that may be acted upon to optimize impact, including financial or other impact.

The aforementioned cloud computing infrastructure may use a data collection platform (such as software that performs data collection at a plant site) associated with a plant to capture data, e.g., sensor measurements, which may be automatically sent to the cloud infrastructure, which may be remotely located, where the data may be reviewed to, for example, eliminate errors and biases, and used to calculate and report performance results. The data collection platform may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform may include an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit or an operation condition. In yet another example, the analysis unit may establish a relationship between at least two operational parameters related to a specific process for the operation of the plant. Finally, in yet another example, one or more of the aforementioned examples may be performed with or without a combination of the other examples.

The plant process model may predict plant performance that is expected based upon plant operation information. The plant process model results can be used to monitor the health of the plant and to determine whether any upset or poor measurement occurred. The plant process model may be generated by an iterative process that models at various plant constraints to determine the desired plant process model.

Using a web-based system for implementing the method of this disclosure may provide one or more benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one or more embodiments, the system may be performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 2D:
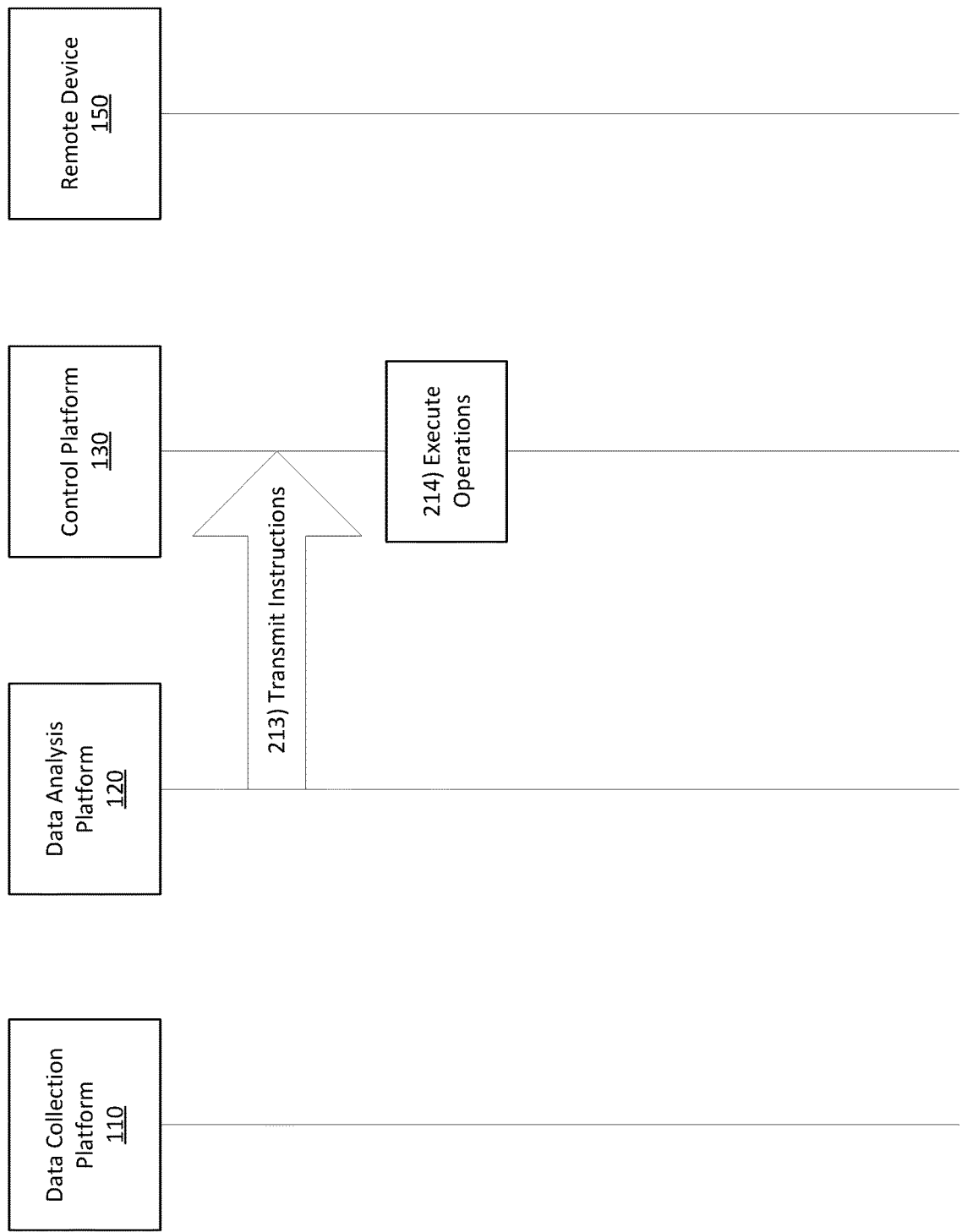

FIGS. 2A-2D depict illustrative system flow diagrams in accordance with one or more embodiments described herein. As shown in FIG. 2A, at step 201, data collection platform 110 may collect sensor data corresponding to one or more reactors from one or more of sensors 110A-110L, additional measurement device(s) 110M, and/or other devices. For example, a first set of sensor data may be collected that corresponds to a first reactor, a second set of sensor data may be collected that corresponds to a second reactor, and so on.

In some instances, the collection of sensor data may be facilitated through execution of the computer-executable instructions of data collection module 112B and/or data historian 112C by processor(s) 111 of data collection platform 110. The sensor data may be collected in real-time and/or at predetermined intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). In some instances, the sensor data collected at step 201 may be filtered by one or more of sensors 110A-110L, additional measurement device(s) 110M, and/or other devices before being collected by data collection platform 110 and, as such, may only include values that are statistically relevant and/or of-interest to data analysis platform 120 in calculating the linear process models.

At step 202, data collection platform 110 may format the sensor data received from one or more of sensors 110A-110L, additional measurement device(s) 110M, and/or other devices. In particular, data collection module 112B and/or data historian 112C may cause data collection platform 110 to analyze the totality of items of sensor data in order to identify and extract particular items of sensor data pertinent in the calculation of the linear process models by data analysis platform 120. For example, data collection platform 110 may identify and extract particular items of sensor data such as feed and yield data, reactor data, chemical composition data, and the like. In some embodiments, such data may correspond to one or more reactors and may be unique to each of the one or more reactors. For instance, a first set of formatted data may correspond to a first reactor, a second set of formatted data may correspond to a second reactor, and so on.

Additionally, in arrangements in which sensor data is not filtered by one or more of sensors 110A-110L, additional measurement device(s) 110M, and/or other devices before being collected by data collection platform 110, data collection module 112B may cause data collection platform 110 to filter the collected sensor data. But in some instances, even if sensor data is filtered by one or more of sensors 110A-110L, additional measurement device(s) 110M, and/or other devices before being collected by data collection platform 110, data collection module 112B may cause data collection platform 110 to perform additional filtering of the received sensor data such that only pertinent data values of the received sensor data are identified and extracted in the formatting process.

At step 203, data collection platform 110 may transmit the sensor data to data analysis platform 120. In particular, data collection platform 110 may transmit the sensor data to data analysis platform 120 by way of communication interface(s) 113 across private network 160. The sensor data transmitted to data analysis platform 120 by data collection platform 110 may include the entirety of the sensor data received by data collection platform 110 from one or more of sensors 110A-110L, additional measurement device(s) 110M, and/or other devices or may only be the particular items of sensor data pertinent in the calculation of the linear process models by data analysis platform 120.

In some instances, data collection platform 110 may store the sensor data in database 112A, which, as stated above, may be a shared database that is accessible by data analysis platform 120. Additionally and/or alternatively, data collection platform 110 may store the sensor data in memory of a computing device independent of data collection platform 110 and/or data analysis platform 120, which may be accessible by at least both devices.

At step 204, data analysis platform 120 may convert mass-based feed and product data received from data collection platform 110 to a molar basis. In particular, converter engine 122E of data analysis platform 120 may cause data analysis platform 120 to perform one or more calculations in order to convert the mass-based feed and product data received from data collection platform 110 to a molar basis. The conversion of feed and product data from a mass basis to a molar basis may be performed in instances in which the entirety of the sensor data is provided by data collection platform 110, as well as when only the particular items of sensor data pertinent in the calculation of the linear process models are provided.

Referring to FIG. 2B, at step 205, data analysis platform 120 may populate a stoichiometric matrix with the molar-based feed data. Specifically, prediction engine 122F may cause data analysis platform 120 to populate a stoichiometric matrix with the molar-based feed data for each reacting molecule. The population may be performed for cases in which either all sensor data is provided by data collection platform 110 or when only the particular, pertinent items of sensor data are provided, or some combination thereof. In populating the stoichiometric matrix, data analysis platform 120 may identify possible reaction outcomes for each molecule included within the feed composition. The process may be repeated by data analysis platform 120 for each of the one or more reactors corresponding to the sensor data collected at step 201. In some instances, the populating of the stoichiometric matrix may be performed by data analysis platform 120 only for significant reacting molecules that have a non-negligible impact on the yield. In other instances, the populating of the stoichiometric matrix may be performed by data analysis platform 120 for each reacting molecule.

At step 206, data analysis platform 120 may calculate coefficients for reaction rates for the reacting molecules of the feed. In some instances, prediction engine 122F may cause data analysis platform 120 to perform such calculations, which may incorporate one or more parameters of the reactors and other factors relating to the molecular reactions. For example, calculation of the coefficients of the reaction rates for the reacting molecules may be based on one or more of the inlet temperature of the reactor, the space velocity, and/or the frequency factor of the reaction. Such calculations may be performed for each reactor based on the respective inlet temperatures, space velocities, and/or frequency factors for each of the one or more reactors.

At step 207, data analysis platform 120 may identify how much of each reacting molecule may be converted based on the reaction rates calculated for the reacting molecules of the feed at step 206. In particular, prediction engine 122F may cause data analysis platform 120 to identify and/or predict molecular quantities of one or more feed inputs based on the reaction rates calculated for the reacting molecules. To do so, data analysis platform 120 may incorporate the reaction rates into one or more differential equations, such as the Arrhenius equation, to identify molecular quantities of one or more feed inputs. Such calculations may be performed for each reactor based on the reaction rates calculated for the reacting molecules at each of the one or more reactors.

At step 208, data analysis platform 120 may calculate yield vectors for each of the one or more reactors. In some instances, prediction engine 122F may cause data analysis platform 120 to calculate and/or predict the yield vectors for each of the one or more reactors based on the molecular quantities of the one or more feed inputs identified at step 207 and reaction rates calculated for the reacting molecules of the feed at each of the one or more reactors at step 206. In doing so, data analysis platform 120 may calculate molar and/or mass solutions for each feed component and predict the yield on a component-by-component basis.

Referring to FIG. 2C, at step 209, data analysis platform 120 may generate one or more linear process models. For example, modeling engine 122G of data analysis platform 120 may cause data analysis platform 120 to adjust and/or optimize the reaction rate coefficients calculated at step 206 to minimize the deviation between the yield vectors calculated at step 208, as generated by prediction engine 122F, and the yield data registered by system sensors and/or measuring devices. In some instances, the adjustment of the reaction rate coefficients to minimize deviation between the yield vectors and the yield data may be performed on a molar basis. Such calculations may be performed for the linear process model associated with each reactor.

At step 210, data analysis platform 120 may utilize the one or more linear process models to optimize plant processes in order to minimize reaction waste and/or maximize reaction yield. In some instances, optimization engine 122H may cause data analysis platform 120 to perform one or more calculations using the linear process models developed at step 209 in order to identify variables such as those related to one or more of feed rate and composition, reactor inlet temperature, space velocity, frequency factor, and/or the like, which may improve, calibrate, and/or optimize plant processes by minimizing waste and/or maximizing yield. Additionally, optimization engine 122H may cause data analysis platform 120 to generate one or more executable instructions that, when executed at control platform 130, for example, cause the operation of one or more reactors to operate under the optimized parameters. In one or more embodiments, data analysis platform 120 may send one or more instructions to control platform 130 to configure and/or control one or more pieces of equipment (e.g., open or close a valve, adjust a flow rate, adjust a feed rate, adjust an operating temperature) at the plant as part of an optimization of one or more plant processes in order to minimize reaction waste and/or maximize reaction yield.

At step 211, data analysis platform 120 may send a first user interface to one or more remote computing devices 150 (e.g., remote device 1 and/or remote device 2) based on the optimized parameters identified at step 210. In sending the first user interface to the one or more remote devices 150, data analysis platform 120 may cause the one or more remote devices 150 to display and/or otherwise present a graphical user interface similar to graphical user interface 300, which is illustrated in FIG. 3.

Figure 3:
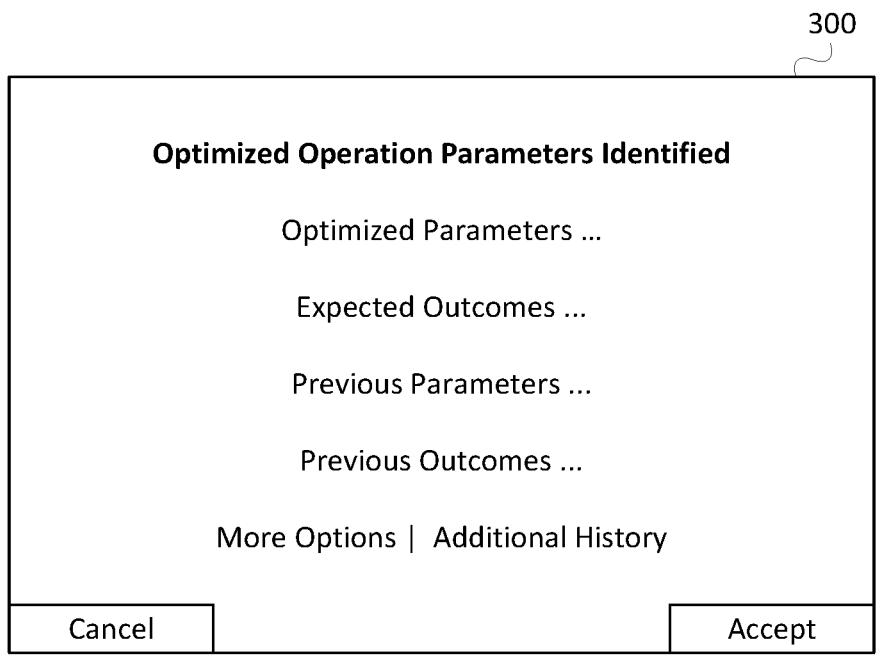
FIG. 3 depicts an example of a first graphical user interface related to one or more aspects of a plant operation in accordance with one or more example embodiments.

As seen in FIG. 3, graphical user interface 300 may include one or more fields, controls, and/or other user interface elements that may allow users of the one or more remote devices 150 to view previous and optimized operation parameters, expected outcomes for implementation of the optimized parameters, and previous outcomes for the previous parameters. Furthermore, graphical user interface

300 may include additional actionable user interface elements that allow users of the one or more remote devices 150 to view more options and/or view additional history concerning the operation of reactors at a plant. In addition, and as seen in FIG. 3, graphical user interface 300 may include one or more other user interface elements, such as buttons "cancel" and "accept," that, if selected by one or more users of remote computing devices 150, may cause the one or more remote computing devices 150 to either close graphical user interface 300 or accept and/or approve the optimized operation parameters in the performance of plant processes.

In some instances, graphical user interface 300 may establish a multi-signature action arrangement contingent on acceptance of the optimized operation parameters by each of remote devices 150 to which graphical user interface 300 was sent by data analysis platform 120. In such instances, each of the one or more remote devices 150 to which graphical user interface 300 was sent by data analysis platform 120 must choose to accept the optimized operation parameters for them to be implemented.

Additionally and/or alternatively, data analysis platform 120 may send graphical user interface 300 to one or more computing devices on private network 160 instead of or in addition to the one or more remote devices 150. In such cases, a multi-signature action arrangement may be established with each of the computing devices to which graphical user interface 300 was sent. For example, graphical user interface 300 may be sent to control platform 130, client portal 140, and/or remote devices 150 (e.g., remote device 1 and/or remote device 2), as well as other computing devices. In order for the optimized operation parameters to be implemented, each of the computing devices to which graphical user interface 300 was sent must accept the updated parameters. In instances in which graphical user interface 300 is only sent to one computing device, then the optimized operation parameters may be implemented if the particular computing device accepts the updated parameters.

Referring back to FIG. 2C, at step 212, each of the one or more remote devices 150 to which graphical user interface 300 was sent at step 211 may transmit a trigger to data analysis platform 120. For example, in reference to FIG. 3, the trigger may include a selection of the "accept" button, which may cause data analysis platform 120 to transmit the optimized operation parameters and/or executable instructions causing optimized system performance to control platform 130 by adjusting parameters such as feed rate and composition, reactor inlet temperature, space velocity, frequency factor, and/or the like. In some instances, however, the trigger may be transmitted directly to control platform 130 and data analysis platform 120 need not be involved.

Referring to FIG. 2D, at step 213, data analysis platform 120 may transmit instructions to control platform 130 to optimize plant processes. In particular, data analysis platform 120 may transmit instructions that, when executed at control platform 130, for example, cause the operation of one or more reactors to operate under the optimized parameters. Alternatively, however, data analysis platform 120 may transmit the optimized operation parameters to control platform 130, which, in turn, may generate computer-executable instructions that cause plant operations to be performed in a manner congruent with the optimized operation parameters. For example, control platform 130 may adjust parameters such as feed rate and composition, reactor inlet temperature, space velocity, frequency factor, and/or the like in order to assimilate with the optimized parameters provided by data analysis platform 120.

In some instances, data analysis platform 120 may send a second user interface to control platform 130 based on the trigger provided by remote devices 150 at step 212. In sending the second user interface to control platform 130, data analysis platform 120 may cause control platform 130 to display and/or otherwise present the user interface. For example, in sending the second user interface to control platform 130, data analysis platform 120 may cause control platform 130 to display and/or otherwise present a graphical user interface similar to graphical user interface 400, which is illustrated in FIG. 4.

Figure 4:
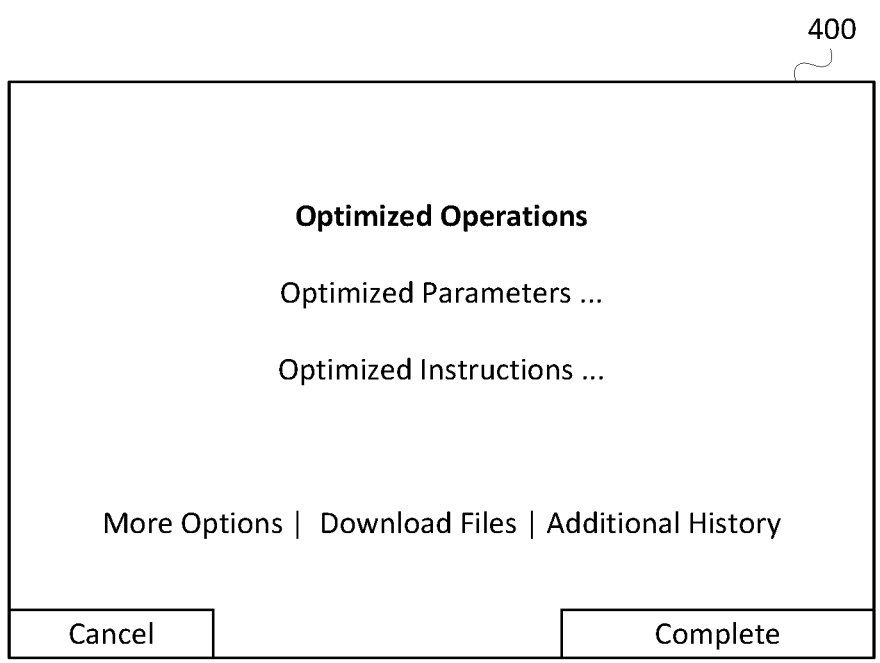
FIG. 4 depicts an example of a second graphical user interface related to one or more aspects of a plant operation in accordance with one or more example embodiments.

As seen in FIG. 4, graphical user interface 400 may include one or more fields, controls, and/or other user interface elements that may allow a user of control platform 130 to access and/or download the computer-executable instructions for optimizing system processes and/or optimized operation parameters. For example, graphical user interface 400 may include one or more fields, controls, and/or other user interface elements that may allow a user of control platform 130 to view the optimized parameters and/or instructions, view more options, download files related to the calculation of the optimized operation parameters and/or generation of the instructions, and/or view additional history concerning the operation of plant processes. In addition, and as seen in FIG. 4, graphical user interface 400 may include one or more other user interface elements, such as buttons "cancel" and "complete," that, if selected by a user of control platform 130, may cause to either close graphical user interface 400 or download the optimized operation parameters and/or execute the instructions.

In other instances, data analysis platform 120 may store the optimized operation parameters and/or instructions in database 122A, which may be accessible by control platform 130. Additionally and/or alternatively, data analysis platform 120 may store the optimized operation parameters and/or instructions in a database of a server and/or other computing device within private network 160, which may be accessible by control platform 130. In such instances, the storing of the optimized operation parameters and/or instructions may cause control platform 130 to display and/or otherwise present graphical user interface 400.

Referring back to FIG. 2D, at step 214, control platform 130 may execute the computer-executable instructions provided by data analysis platform 120 in order to optimize plant processes. In doing so, control platform 130 may cause each of the one or more reactors of the plant to operate under the optimized conditions. In some instances, control platform 130 may generate instructions based off the optimized operation parameters, which in turn may cause control platform 130 to each of the one or more reactors of the plant to operate under the optimized conditions.

Aspects of the present disclosure are directed to monitoring catalytic reforming processes for potential and existing issues, providing alerts, and/or adjusting operating conditions to extend reactor operative lifespan. There are many process performance indicators that may be monitored including, but not limited to, reactants, products, temperature, and/or pressure.

In some embodiments, a system may determine operating characteristics. The system may determine system performance characteristics. The system may determine optimal operating characteristics. In some embodiments, the optimal operating characteristics may be based on a designed-for operating level, a regulation (e.g., a maximum allowable emission level), or one or more other criteria. The system may determine whether there is a difference between recent operating performance and the optimal operating performance. If there is a difference, the system may suggest adjusting one or more operating characteristics to decrease the difference between the actual operating performance in the recent and the optimal operating performance.

In some embodiments, the system may automatically adjust the one or more operating characteristics. Alternatively or additionally, the system may provide an alert or other information to a device (e.g., a remote device) associated with an operator, with a request to adjust the one or more operating characteristics. In one example the system may adjust the flow of reactants into a reactor, temperature, pressure, or the like. Adjusting the operating characteristics may be performed in an iterative fashion.

Periodically, the system may determine whether there is a difference between the actual operating performance and the optimal performance, and if so, again adjust operating characteristics to decrease the difference. By iteratively reviewing recent performance and adjusting characteristics, the system may thereby optimize the operating performance for one or more reactors of a plant. This may result in improved performance, e.g., extended absorbent life in the one or more reactors of the plant.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A method, comprising:
    receiving, by a data analysis platform comprising a processor and memory, one or more items of sensor data from a data collection platform, wherein the one or more items of sensor data are related to one or more reactors;
    based on the one or more items of sensor data, generating a linear process model for each of the one or more reactors;
    populating a stoichiometric matrix with a set of data of the one or more items of sensor data, wherein the set of data includes yield data and an identification of each molecule within a feed composition;
    based on the populated stoichiometric matrix, identifying reaction outcomes for each molecule within the feed composition;
    calculating a first reaction rate coefficient for each molecule within the feed composition; based on the calculated first reaction rate coefficient for each molecule within the feed composition, identifying convertible quantities for each molecule within the feed composition;
    calculating a yield vector for each of the one or more reactors based on the calculated first reaction rate coefficient and the identified convertible quantities for each molecule within the feed composition,
    wherein the linear process model for each of the one or more reactors is generated based on the calculated yield vector and the first reaction rate coefficient for each molecule within the feed composition
    based on the linear process model for each of the one or more reactors, generating commands for optimizing processing at each of the one or more reactors; and
    transmitting the commands for optimizing the processing at each of the one or more reactors to a control platform associated with each of the one or more reactors.

2. The method of claim 1, further comprising:
    responsive to calculating the yield vector for each of the one or more reactors, optimizing the calculated first reaction rate coefficient for each molecule within the feed composition,
    wherein the optimizing involves identifying a second reaction rate coefficient for each molecule within the feed composition that minimize deviation between the calculated yield vectors and the yield data.

3. The method of claim 1, further comprising:
    responsive to generating the commands for optimizing processing at each of the one or more reactors, displaying on a first remote device a first user interface comprising a first user interface element for approving the generated commands; and
    receiving, through the first user interface, a first trigger approving the generated commands, the first trigger indicating a selection of the first user interface element for approving the generated commands.

4. The method of claim 3, wherein transmitting, by the data analysis platform and to the control platform, the commands for optimizing the processing at each of the one or more reactors is based on the first trigger indicating the selection of the first user interface element for approving the generated commands.

5. The method of claim 3, further comprising:
    responsive to generating commands for optimizing processing at each of the one or more reactors, displaying on a second remote device, different from the first remote device, a second user interface comprising a second user interface element for approving the generated commands; and
    receiving, through the second user interface, a second trigger approving the generated commands, the second trigger indicating a selection of the second user interface element for approving the generated commands.

6. The method of claim 5, wherein transmitting, by the data analysis platform to the control platform, the commands for optimizing the processing at each of the one or more reactors is based on the first trigger indicating the selection of acceptance via the first user interface element and the second trigger indicating the selection of acceptance via the second user interface element.

7. A method, comprising:
    receiving, by a data analysis platform comprising a processor and memory, one or more items of sensor data from a data collection platform, wherein the one or more items of sensor data are related to one or more reactors;
    based on the one or more items of sensor data, generating a linear process model for each of the one or more reactors;
    populating a stoichiometric matrix with a set of data of the one or more items of sensor data, wherein the set of data includes yield data and an identification of each molecule within a feed composition;
    calculating a first reaction rate coefficient for each molecule within the feed composition; based on the calculated first reaction rate coefficient for each molecule within the feed composition, identifying convertible quantities for each molecule within the feed composition;
    calculating a yield vector for each of the one or more reactors based on the calculated first reaction rate coefficient and the identified convertible quantities for each molecule within the feed composition;

wherein the linear process model for each of the one or more reactors is generated based on the calculated yield vector and the first reaction rate coefficient for each molecule within the feed composition;

based on the linear process model for each of the one or more reactors, generating commands for optimizing processing at each of the one or more reactors;

transmitting the commands for optimizing the processing at each of the one or more reactors to a control platform associated with each of the one or more reactors;

responsive to generating the commands for optimizing processing at each of the one or more reactors, displaying on a first remote device a first user interface comprising a first user interface element for approving the generated commands; and receiving, through the first user interface, a first trigger approving the generated commands, the first trigger indicating a selection of the first user interface element for approving the generated commands.

8. The method of claim 7, wherein transmitting, by the data analysis platform and to the control platform, the commands for optimizing the processing at each of the one or more reactors is based on the first trigger indicating the selection of the first user interface element for approving the generated commands.

9. The method of claim 7, further comprising:

responsive to generating commands for optimizing processing at each of the one or more reactors, displaying on a second remote device, different from the first remote device, a second user interface comprising a second user interface element for approving the generated commands; and receiving, through the second user interface, a second trigger approving the generated commands, the second trigger indicating a selection of the second user interface element for approving the generated commands.

10. The method of claim 9, wherein transmitting, by the data analysis platform and to the control platform, the commands for optimizing the processing at each of the one or more reactors is based on the first trigger indicating the selection of the first user interface element and the second trigger indicating the selection of the second user interface element.

11. The method of claim 7, further comprising:

responsive to calculating the yield vector for each of the one or more reactors, optimizing the calculated first reaction rate coefficient for each molecule within the feed composition, wherein the optimizing involves identifying a second reaction rate coefficient for each molecule within the feed composition that minimize deviation between the calculated yield vectors and the yield data.

\* \* \* \* \*